US011260744B2

(12) United States Patent
    Volkmer et al.

(10) Patent No.: US 11,260,744 B2
(45) Date of Patent: Mar. 1, 2022

(54) SYSTEMS FOR MONITORING VOLATILE FUEL SYSTEM COMPONENTS

(71) Applicant: Agility Fuel Systems LLC, Costa Mesa, CA (US)

(72) Inventors: Michael Gregory Volkmer, Lincoln, NE (US); Chad Alvin Cederberg, Lincoln, NE (US); David Neil Morgan, Weston, NE (US); Glen Edward Lampe, Lincoln, NE (US); Michael Dean Hawkins, Lincoln, NE (US); Hector Adrian Ortiz, Pico Rivera, CA (US); Eric M. Coupal-Sikes, Kelowna (CA); Todd F. Sloan, Kelowna (CA); Chris Forsberg, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 116 days.

(21) Appl. No.: 16/812,044

(22) Filed: Mar. 6, 2020

(65) Prior Publication Data
    US 2020/0198458 A1    Jun. 25, 2020

Related U.S. Application Data

(63) Continuation of application No. PCT/US2018/050962, filed on Sep. 13, 2018.
    (Continued)

(51) Int. Cl.
    *B60K 15/03*        (2006.01)
    *B60K 15/035*       (2006.01)
    (Continued)

(52) U.S. Cl.
    CPC ............ *B60K 15/035* (2013.01); *F02D 41/22* (2013.01); *F16K 17/003* (2013.01);
    (Continued)

(58) Field of Classification Search
    CPC ........ B60K 15/035; B60K 2015/03561; B60K 2015/0358; B60K 2015/0319; F02D 41/22; F16K 17/003; F16K 17/366
    See application file for complete search history.

(56) References Cited

U.S. PATENT DOCUMENTS

2,072,577 A    3/1937  Allen
2,557,199 A    6/1951  Olson
(Continued)

FOREIGN PATENT DOCUMENTS

DE    3940843 A1    6/1991
DE    4132741 A1    4/1993
(Continued)

OTHER PUBLICATIONS

International Search Report issued in PCT Application No. PCT/US2018/050962, dated Dec. 21, 2018.

*Primary Examiner* — Joseph J Dallo
(74) *Attorney, Agent, or Firm* — Knobbe, Martens, Olson & Bear, LLP

(57) ABSTRACT

A fuel system is provided that includes a fuel tank, a heat detector, and a control circuit. The digital heat detector is disposed in proximity to the fuel tank. The control circuit is coupled with the digital heat detector and is configured to detect that a thermal event has occurred. The fuel system is configured to implement an emergency countermeasure in response to the detection of the thermal event.

20 Claims, 19 Drawing Sheets

Related U.S. Application Data

(60) Provisional application No. 62/558,587, filed on Sep. 14, 2017.

(51) Int. Cl.
*F02D 41/22* (2006.01)
*F16K 17/00* (2006.01)
*F16K 17/36* (2006.01)

(52) U.S. Cl.
CPC .... *F16K 17/366* (2013.01); *B60K 2015/0358* (2013.01); *B60K 2015/03561* (2013.01)

(56) References Cited

U.S. PATENT DOCUMENTS

| | | |
|---|---|---|
| 3,043,331 A | 7/1962 | Peters |
| 4,224,994 A | 9/1980 | Tone et al. |
| 4,577,607 A | 3/1986 | Nishio |
| 4,608,208 A | 8/1986 | Yogo et al. |
| 4,699,171 A | 10/1987 | Sugden |
| 4,717,072 A | 1/1988 | Girardin |
| 5,042,520 A | 8/1991 | Reznik |
| 5,131,424 A | 7/1992 | Heidorf et al. |
| 5,211,371 A | 5/1993 | Coffee |
| 5,255,809 A | 10/1993 | Ervin et al. |
| 5,263,824 A | 11/1993 | Waldbeser et al. |
| 5,341,844 A | 8/1994 | Wass et al. |
| 5,345,963 A | 9/1994 | Dietiker |
| 5,522,428 A | 6/1996 | Duvall |
| 5,531,275 A | 7/1996 | Sundholm |
| 5,562,117 A | 10/1996 | Borland et al. |
| 5,632,297 A | 5/1997 | Sciullo et al. |
| 5,657,824 A | 8/1997 | Sundholm |
| 5,788,212 A | 8/1998 | Hackman et al. |
| 6,112,760 A | 9/2000 | Scott et al. |
| 6,202,688 B1 | 3/2001 | Khadim |
| 6,247,678 B1 | 6/2001 | Hines et al. |
| 6,257,360 B1 | 7/2001 | Wozniak et al. |
| 6,260,516 B1 * | 7/2001 | Brister ............... B60K 15/0406 123/41.15 |
| 6,269,830 B1 | 8/2001 | Ingle |
| 6,321,775 B1 | 11/2001 | Hildebrand et al. |
| 6,382,232 B1 | 5/2002 | Portmann |
| 6,397,791 B1 * | 6/2002 | Brister ............... B60K 15/0406 123/198 D |
| 6,418,962 B1 | 7/2002 | Wozniak et al. |
| 6,679,263 B2 | 1/2004 | Luchetti et al. |
| 6,691,683 B2 | 2/2004 | Gracyalny et al. |
| 6,793,199 B2 | 9/2004 | Bushik et al. |
| 6,840,257 B2 | 1/2005 | Dario et al. |
| 6,843,465 B1 | 1/2005 | Scott |
| 6,871,802 B2 | 3/2005 | Stilwell et al. |
| 6,877,718 B2 | 4/2005 | Nimberger |
| 7,487,826 B2 | 2/2009 | Pineo et al. |
| 7,762,272 B2 | 7/2010 | Delfino et al. |
| 7,815,161 B2 | 10/2010 | Saitoh et al. |
| 7,971,651 B2 | 7/2011 | Tanju et al. |
| 8,096,708 B2 | 1/2012 | Harrington |
| 8,414,366 B2 | 4/2013 | Browne et al. |
| 8,511,334 B2 | 8/2013 | Sparschuh |
| 8,550,105 B2 | 10/2013 | Ishitoya et al. |
| 8,567,757 B2 | 10/2013 | Pitchford et al. |
| 8,646,540 B2 | 2/2014 | Eckholm et al. |
| 8,668,110 B1 | 3/2014 | Traxler et al. |
| 8,714,199 B2 | 5/2014 | Deperraz et al. |
| 8,720,722 B2 | 5/2014 | Sunday et al. |
| 8,807,256 B2 | 8/2014 | Gibb et al. |
| 8,820,069 B2 | 9/2014 | Makinson et al. |
| 8,844,662 B2 | 9/2014 | Tsubokawa |
| 8,851,443 B2 | 10/2014 | Foshansky |
| 8,915,322 B2 | 12/2014 | Gibb et al. |
| 9,097,358 B2 | 8/2015 | Girouard |
| 9,121,521 B2 | 9/2015 | Girouard |
| 9,404,598 B2 | 8/2016 | Girouard |
| 9,682,618 B2 | 6/2017 | Baik et al. |
| 10,942,533 B2 | 3/2021 | Hawkins et al. |
| 2001/0042534 A1 * | 11/2001 | Brister ............... B60K 15/0406 123/198 D |
| 2009/0078706 A1 | 3/2009 | Ishitoya et al. |
| 2009/0288713 A1 | 11/2009 | Hirakata |
| 2011/0083756 A1 | 4/2011 | Hwang et al. |
| 2012/0011843 A1 | 1/2012 | Makinson et al. |
| 2012/0199764 A1 | 8/2012 | Girouard |
| 2012/0228307 A1 | 9/2012 | Simmons |
| 2013/0112295 A1 | 5/2013 | McNicholas |
| 2013/0118456 A1 | 5/2013 | Gutscher et al. |
| 2014/0110613 A1 | 4/2014 | Pitchford et al. |
| 2014/0251479 A1 | 9/2014 | Gibb et al. |
| 2014/0312683 A1 | 10/2014 | McNicholas |
| 2016/0033085 A1 | 2/2016 | Sirosh et al. |
| 2016/0229286 A1 | 8/2016 | Baik et al. |
| 2017/0167925 A1 * | 6/2017 | Safai ........................ G01K 1/08 |
| 2017/0340911 A1 | 11/2017 | Meyer et al. |
| 2018/0037107 A1 | 2/2018 | Baik et al. |
| 2018/0266577 A1 | 9/2018 | Garg |
| 2020/0017352 A1 * | 1/2020 | Yang ..................... B60K 15/035 |
| 2021/0172540 A1 | 6/2021 | Morgan et al. |

FOREIGN PATENT DOCUMENTS

| | | |
|---|---|---|
| DE | 693 11 502 T2 | 10/1997 |
| DE | 10 2017 200467 | 7/2018 |
| EP | 2 000 719 A1 | 12/2008 |
| JP | 2006-523514 | 10/2006 |
| KR | 2000-0039103 | 7/2000 |
| KR | 2006-808171 * | 8/2004 |
| KR | 10-2010-0048638 | 5/2010 |
| KR | 10-2011-0058980 | 6/2011 |
| WO | WO 2004/014683 A1 | 2/2004 |
| WO | WO 2008/010045 | 1/2008 |
| WO | WO 2010/101976 A1 | 9/2010 |
| WO | WO 2016/019057 | 2/2016 |
| WO | WO 2016/086326 | 6/2016 |
| WO | WO 2016/126958 | 8/2016 |
| WO | WO 2019/055711 | 3/2019 |

* cited by examiner

SYSTEMS FOR MONITORING VOLATILE FUEL SYSTEM COMPONENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Technical Field

This application relates to techniques to enhance safety of vehicles powered by volatile fuels including vehicles powered by fuels that are stored under pressure.

Related Art

Natural gas powered automobiles reduce harmful emissions compared to traditional fuels. Natural gas fuel systems for automobiles store the natural gas in specialized tanks at high pressure to enable a natural gas powered automobile to have greater range. Other alternative fuels also can lessen the environmental impact of combustion engine powered vehicles. Some of these other alternative fuels are volatile but can be stored under lesser pressure than natural gas. Certain precautions have been developed to address safety concerns with storing natural gas at high pressure. In one approach, a thermally activated pressure relief device (PRD) is coupled with the fuel tank to vent the fuel tank contents in the event of a fire. The PRD can open a valve to vent the fuel tank if a thermal threshold is exceeded.

PRDs have many different configurations. One type of PRD uses a heat-responsive fuse cord that is positioned in proximity to a pressure vessel. When ignited the fuse cord burns a coupler to transfer heat to a thermal actuator. The thermal actuator can be a thermally-responsive frangible bulb fuse or other device that opens a valve to vent the contents of the vessel when heated above a threshold.

Point sensors have been proposed for detecting thermal events in vehicles. While sensing temperature at discrete points is useful for high pressure fuels and for lower pressure volatile fuels, such sensors are highly localized.

SUMMARY

Although thermal PRDs can provide one or more means for venting a pressure vessel during a fire and point sensors can detect heat at a specific location, such devices do not provide enough information for control system decisions or other analyses. For example, a control system that has, as an input, temperatures over more than a point, e.g., around the fuel tank can help more precisely determine whether and when to vent a fuel tank containing a high pressure fuel or other volatile fuel disposed in a fuel tank. It would be beneficial to record information about the time, temperature, and location of heat above a threshold that could constitute a thermal event, which could create a pressure vessel emergency. Also, it would be beneficial to implement a system that could accurately discern which of several emergency response actions is appropriate for a thermal event.

In one embodiment, a fuel system is provided that includes a fuel tank, a heat detector, and a processor, which can be implemented in at least one controller. The heat detector comprises at least one digital heat detector in some embodiments that is disposed in proximity to the fuel tank. The at least one controller is coupled with the heat detector and is configured to detect that a thermal event has occurred. The fuel system is configured to implement an emergency countermeasure in response to the detection of the thermal event.

The heat detector can be a linear heat detector in certain embodiments. The linear detector can detect heat at any point along a length thereof in certain embodiments. Such detection can help locate a thermal event as discussed below. The heat detector can be a linear digital heat detector.

Linear heat detectors advantageously cover more area around the fuel tank than would a point sensor or even a diffuse array of point sensors. A system employing a heat detector can have a faster activation time, thereby enhancing safety.

In some embodiments, the process simultaneously monitors for a location of a thermal event along the heat detector and for a signal indicative of the temperature at the location.

In another embodiment a method is provided. A signal is applied to a heat detector disposed about a high pressure fuel tank. A thermal event having occurred is confirmed. The fuel tank is vented following confirming the thermal event.

In another method, a signal is received from a heat detector disposed about a high pressure fuel tank. A thermal event having occurred is confirmed using the heat detector. An emergency countermeasure is implemented subsequent to confirming the thermal event.

In some methods, when signals from a heat detector indicate a thermal evert at a location of the heat detector, a temperature at the location can be considered additionally to confirm the thermal event.

BRIEF DESCRIPTION OF THE DRAWINGS

The systems, methods and devices may be better understood from the following detailed description when read in conjunction with the accompanying schematic drawings, which are for illustrative purposes only. The drawings include the following figures.

DETAILED DESCRIPTION OF EMBODIMENTS

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application is directed to apparatuses, systems and methods for detecting a level of heat in and around a high pressure fuel cylinder, sometimes referred to herein as a fuel tank, in order to enable a control system to more intelligently implement thermal event countermeasures. For example, the apparatuses, systems, and methods disclosed herein enable the heat level in and around high-pressure fuel cylinders to be monitored such that venting and other disruptive heat event countermeasures are deployed only when the thermal event exceeds a threshold justifying such action.

Figure 1:
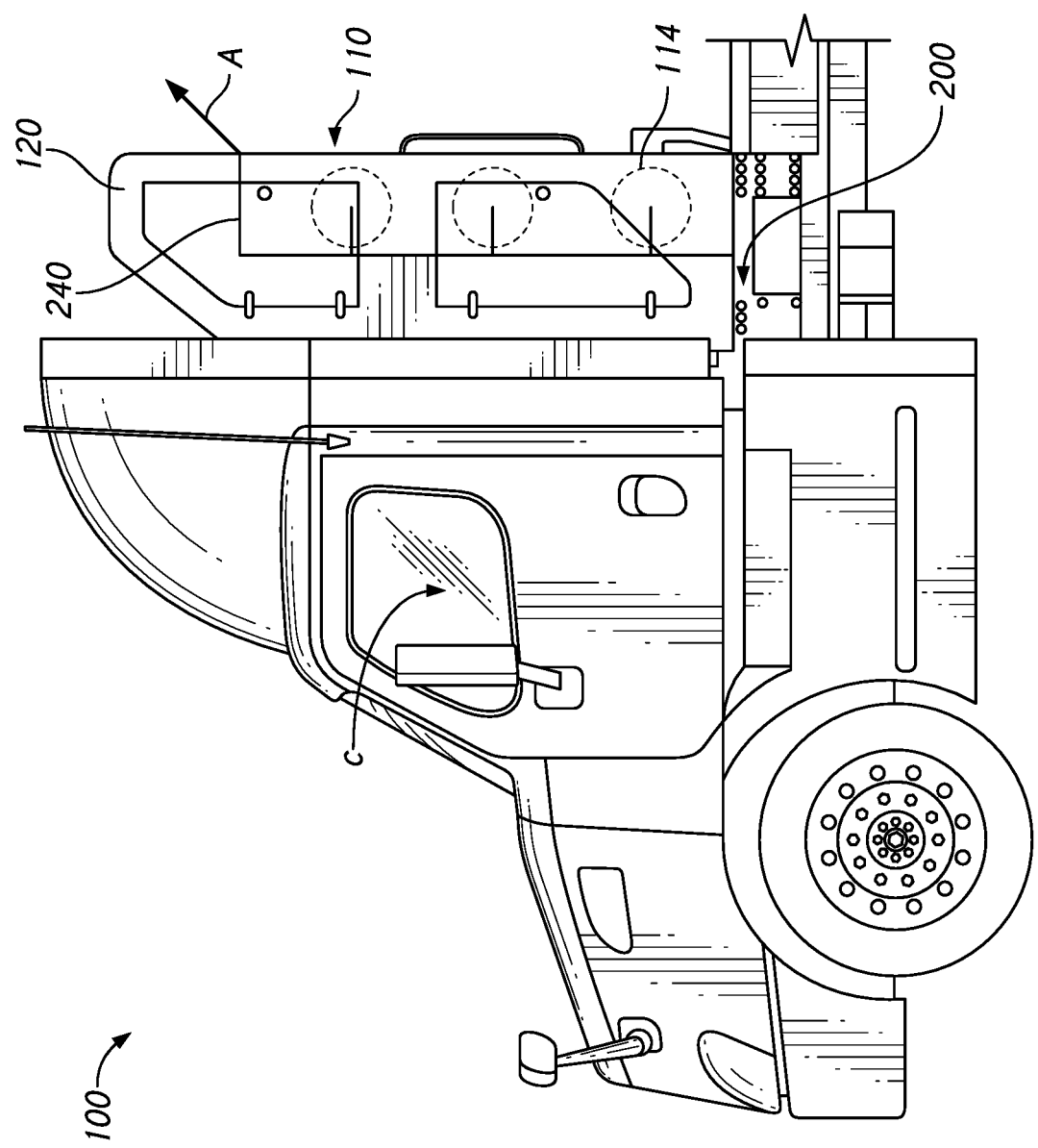
FIG. 1 is a side view of a vehicle having a fuel system mounted to the vehicle behind the cab, sometimes referred to as a back-of-cab mounted fuel system.
Figure 2A:
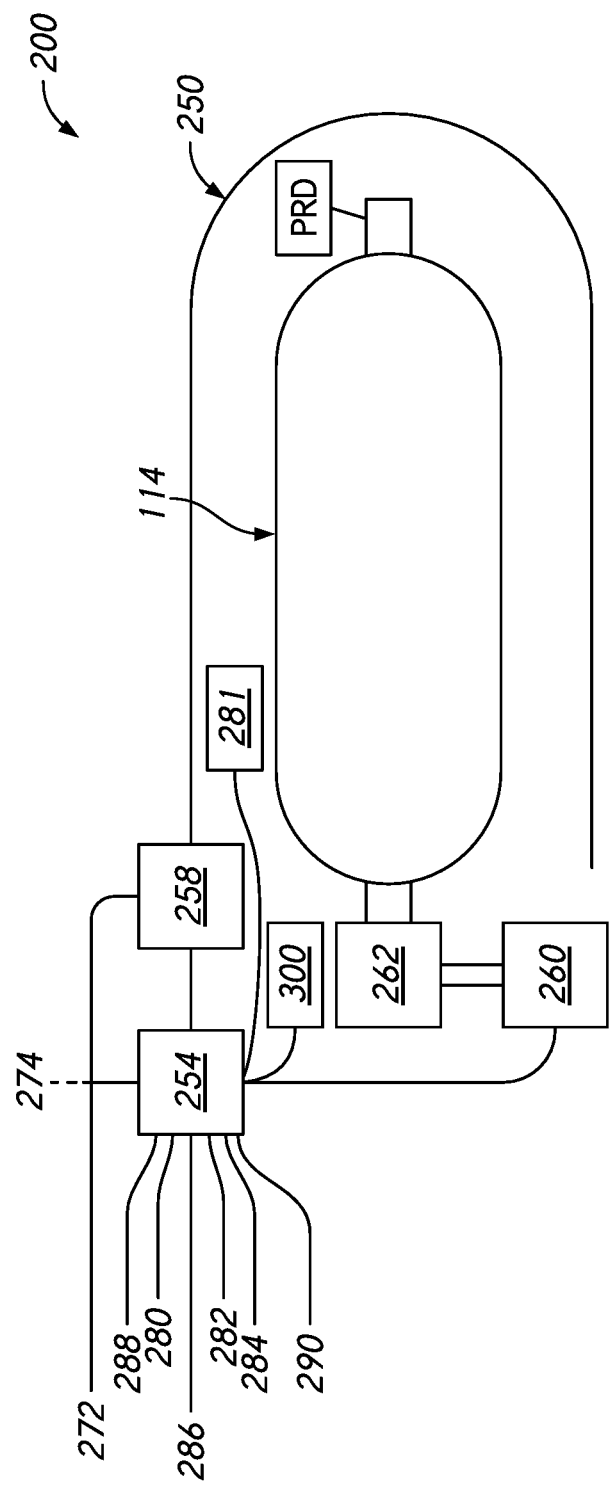
FIG. 2A is a schematic diagram of a heat detector for a vehicle fuel system.

FIG. 1 is a schematic of a vehicle 100 with a fuel system 110 that has a thermal event management system coupled therewith. One embodiment of a thermal event management system 200 is shown in FIG. 2A. The vehicle 100 may be any type of vehicle known in the art. The vehicle 100 may be a truck, such as a light duty truck (e.g., class 1, class 2 or class 3), medium duty truck (e.g., class 4, class 5 or class 6), or heavy-duty truck (e.g., class 7 or class 8). In some embodiments, the vehicles may be cars, wagons, vans, buses, high-occupancy vehicles, dump trucks, tractor trailer trucks, transit, refuse or heavy-duty vehicles, or any other vehicles. The vehicle may have any weight. For example, the vehicle may weigh more than or equal to about 5000 lbs, 7,500 lbs, 10,000 lbs, 12,500 lbs, 15,000 lbs, 17,500 lbs, 20,000 lbs, 22,500 lbs, 25,000 lbs, 30,000 lbs, or 35,000 lbs. In some cases, the vehicle may have a weight up to or exceeding 80,000 lbs.

Figure 7:
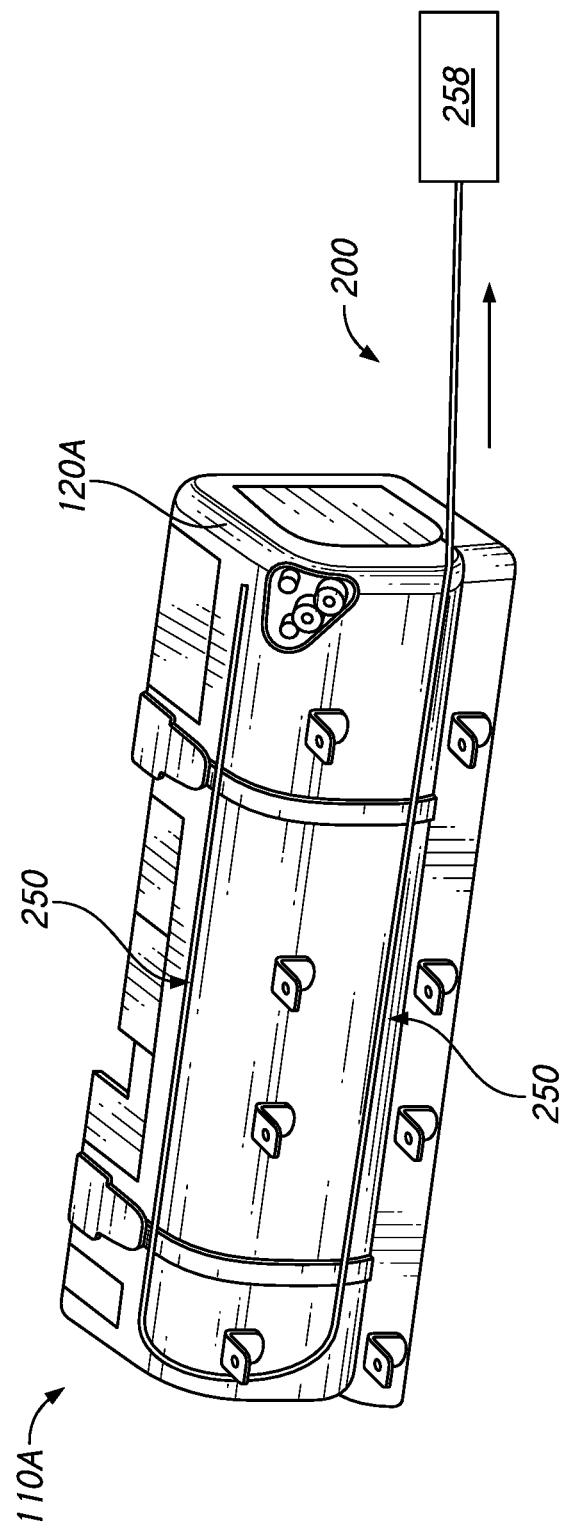
FIGS. 7 and 8 illustrate examples of frame rail mountable fuel systems incorporating the digital heat detector of FIG. 2A.
Figure 8:
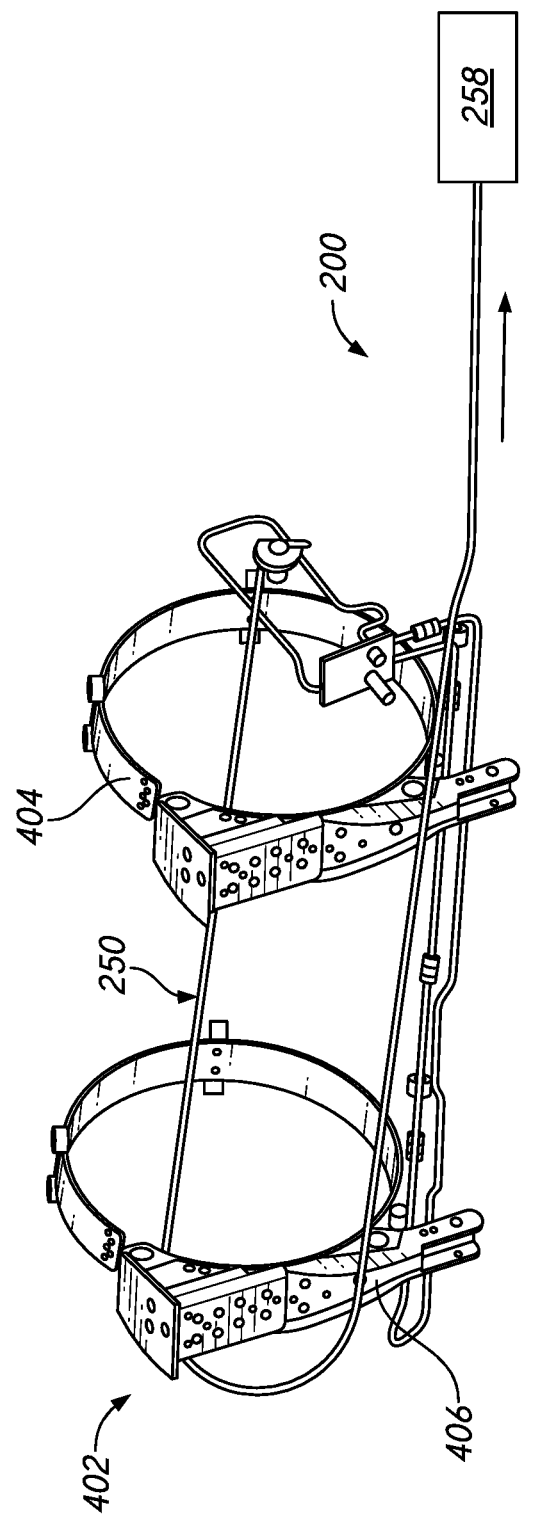
Figure 9:
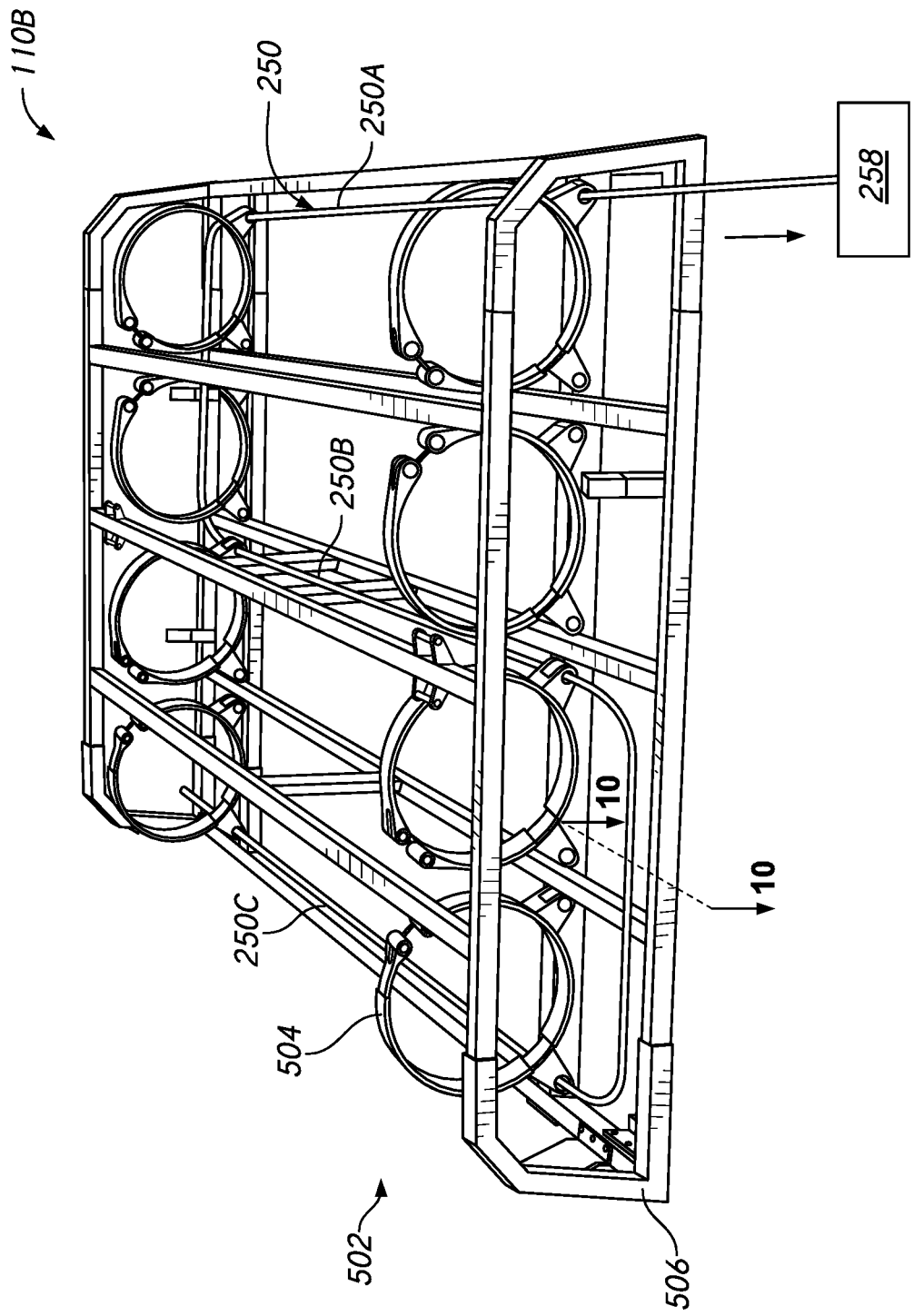
FIG. 9 illustrates examples of roof-top mountable fuel systems incorporating the digital heat detector of FIG. 2A.

FIG. 1 illustrates the fuel system 110 mounted to the vehicle 100 in a behind-the-cab or back-of-cab configuration. In the behind-the-cab configuration, the fuel system 110 may be installed behind the cab C on the vehicle frame, providing, for example, standard fuel capacities, measured in diesel gallon equivalents (DGE), of 45 DGE, 60 DGE, 75 DGE or 100 DGE. In certain configurations, the fuel system 110 can be configured to provide 180 DGE or more. The fuel system 110 may be mounted to the vehicle in other configurations. For example, FIGS. 7 and 8 show a side- or rail-mount configuration with the fuel system 110 installed on the side of the vehicle frame. Fuel systems may be installed on one or both sides of the vehicle, providing, for example, standard fuel capacities of 40 DGE, 60 DGE, 80 DGE, 100 DGE, or 120 DGE or more. FIGS. 8 and 9 illustrate components of a roof mounted system. In an additional example, in a front-of-the-body configuration, the fuel system 110 may be installed in front of the vehicle body, providing, for example, standard fuel capacities of 60-100 DGE. In further examples, the fuel system 110 may be installed in a custom integration, providing a wide range of customizable fuel capacities. A variety of mounting locations on the vehicle frame are possible.

The vehicle 100 may be propelled by a fuel, including, but not limited to, compressed natural gas (CNG), liquefied natural gas (LNG), liquefied petroleum gas (LPG), Diesel fuel, gasoline, propane, dimethyl ether (DME), methanol, ethanol, butanol, Fischer-Tropsch (FT) fuels, hydrogen or hydrogen-based gas, hythane, HCNG, syngas and/or other alternative fuels or fuel blends. For example, natural gas in the form of CNG or LNG may be an alternative fuel of choice for transit, refuse, and many other heavy-duty vehicles.

The fuel may be stored as a compressed gas, as a liquefied gas or as a liquid under its own vapor pressure. The fuel may be stored in the fuel system 110 comprising a fuel tank 114. The fuel tank can be a cylinder or any other type of device capable of containing a fuel in compressed gas, liquefied gas or liquid form.

The fuel tank 114 may be configured in accordance with the chosen fuel storage mode. For example, compressed gases, such as CNG, may require that the fuel tank 114 be outfitted with adequate high pressure components (e.g., high pressure seals, standard operation relief valves, compression devices), wherein high-strength and lightweight materials may allow CNG pressures up to, for example, 3,600 psig. In another example, liquefied gases, such as LNG, may require that the fuel tank 114 be outfitted with adequate liquefaction components (e.g., coolers, liquid-vapor separators, insulation). LNG systems may operate at pressures of, for example, 0 psig, 50 psig, 100 psig, 150 psig, 200 psig, 250 psig, 300 psig, or 350 psig and temperatures of, for example, $-259°$ F., $-223°$ F., $-200°$ F., $-186°$ F., $-175°$ F., $-167°$ F., $-158°$ F., or $-150°$ F., requiring the use of cryogenic (about $-260°$ F.) piping systems and vacuum-insulated storage tanks.

In some embodiments, the vehicle 100 may include a single fuel tank 114. In other embodiments, the vehicle 100 may contain a plurality of fuel tanks 114. The fuel tanks may or may not have the same characteristics. The fuel tanks may be mounted to any portion of the vehicle. In some embodiments, the fuel tanks may be mounted to a side of the vehicle. One, two, or more tanks may be mounted on a single side of the vehicle, or on each side of the vehicle. The side-mounted tanks may at least partially protrude from a side surface of the vehicle.

The one or more fuel tanks 114 may provide storage for a predetermined amount, or capacity, of fuel. For example, for natural gas measured in diesel/gasoline gallon equivalents (where 1 gasoline gallon equivalent (GGE)=standard cubic feet (SCF) of natural gas divided by 123, and 1 diesel gallon equivalent (DGE)=standard cubic feet (SCF) of natural gas divided by 139), the amount of fuel provided on board the vehicle may be, for example, up to about 28 DGE, 45 DGE, 52 DGE, 60 DGE, 63 DGE, 70 DGE, 75 DGE, 80 DGE, 88 DGE, 92 DGE, 140 DGE, 100 DGE, 105 DGE, 120 DGE, 140 DGE, 160 DGE, 176 DGE, or more than 176 DGE.

The fuel tank 114 may have any size and/or weight. For example, the fuel tank may be larger than, smaller than, or about the same size as a 5 gallon tank, 7 gallon tank, 10 gallon tank, 15 gallon tank, 20 gallon tank, 25 gallon tank, 30 gallon tank, 40 gallon tank, 50 gallon tank, 70 gallon tank, 90 gallon tank, 110 gallon tank, 130 gallon tank, 150 gallon tanks, or 170 gallon tank. The fuel tank may weigh more than, less than, or equal to about 0.01 tons, 0.03 tons, 0.05 tons, 0.07 tons, 0.1 tons, 0.2 tons, 0.3 tons, 0.5 tons, 0.7 tons, or 1.0 tons. For example, the fuel tanks may be of cylindrical form with dimensions (diameter in inches×length in inches) of, for example, 25"×39", 25"×61", 25"×80", 25"×90", 26"×80", 26"×90", 26"×120", 26"×76", 16"×80", 21"×86", 16"×120", 21"×70", 21"×86", and one or more cylinders may be combined to achieve a predetermined total fuel capacity.

The fuel system 110 may be capable of containing a fuel at a predetermined pressure. For example, the fuel system 110 may be capable of containing a fuel having a pressure of less than or equal to about 10000 psig, 8000 psig, 7000 psig, 6500 psig, 6000 psig, 5500 psig, 5000 psig, 4750 psig, 4500 psig, 4250 psig, 4000 psig, 3750 psig, 3500 psig, 3250 psig, 3000 psig, 2750 psig, 2500 psig, 2000 psig, 1500 psig, 1000 psig, 500 psig, 300 psig, 100 psig, or less. Optionally, the fuel system may be structurally capable of containing a fuel having a high pressure value, such as at least the pressure values described above.

In embodiments requiring cooling and/or insulation, such as in LNG fuel systems, the fuel system components may be appropriately outfitted with insulation, chillers and/or other components known in the art. For example, the fuel transfer lines and the fuel tank 114 may be wound with insulation.

The fuel system 110 may have one or more fuel outputs. The fuel output may transfer the fuel to another part of the vehicle 100, such as an engine. In one example, the fuel may be output to mix with air in the cylinder of an engine. The thermal event management system 200 (see FIG. 2A) provides novel modes managing emergency situation as discussed herein.

The fuel system 110 may be housed in a cover 120, which may be mounted to the vehicle, and may serve to contain and protect the fuel tank 114 and other fuel system components. The cover 120 may be made of a variety of materials, including, but not limited to, metal or metal alloys (e.g., steel, iron, aluminum, titanium, copper, brass, nickel, silver, or any alloys or combinations thereof), composite materials (e.g., carbon fiber, fiberglass), or polymer materials. The cover 120 may be made of a single material or may comprise multiple pieces made of different materials. The fuel system 110 may be partially housed in the cover 120. In some embodiments, one or more components of the fuel system 110 or the thermal event management system 200 preferably is located inside the cover 120. Components of the thermal event management system 200 may reside partially inside and partially outside of the cover 120.

FIG. 2A shows more details regarding various embodiments of the thermal event management system 200. The system 200 includes a heat detector 250 disposed in proximity to the fuel tank 114. The heat detector 250 can be any device that is able to generate a signal that indicates a level of heat around the fuel tank 114 to provide a basis for a more informed response to thermal events. The heat detector 250 can include a linear heat detector in some embodiments. A thermocouple cable is one example of a linear heat detector that can be used in some embodiments. A thermocouple cable is able to sense temperature at any point along the cable. Temperature sensing arises from direct contact between two dissimilar metals generating a corresponding voltage. In one embodiment, the thermocouple cable includes two conductor wires of different material isolated from each other by an insulator. The conductors come into direct contact when the insulator is removed, such as by melting during a thermal event. An example of a thermocouple cable is set forth in U.S. Pat. No. 8,096,708, which is incorporated by reference herein in its entirety.

The heat detector 250 can employ other heat detection technologies. For instance, the heat detector 250 can include a fiber optic cable configured to sense heat in proximity to the fuel tank 114. The heat detector 250 can be coupled with a controller 254 or other processor such as an electronic control unit (ECU) of the fuel system 110. The heat detector 250 can be electrically coupled by a wire directly to the controller 254 or by way of a signal conditioner 258. The signal conditioner 258 can be integrated into the controller 254 or another component of the system 200 in various embodiments. The heat detector 250 can be electrically coupled to the controller 254 and/or the signal conditioner 258 by a wireless transmitter. The controller 254 or other processor such as an electronic control unit (ECU) of the fuel system 110 are all examples of control circuits that can be used to operate an emergency countermeasure. A switch can also be used as a control circuit for operating emergency countermeasure components of the system 200. For example a switch can be integrated into or replace the signal condition 258 and can be directly connected to any one or more of the emergency countermeasures discussed below.

The controller 254 can be coupled with a vent system 260. The vent system 260 can include a solenoid or other actuator that initiates the opening of a valve 262. The valve 262 conveys the contents of the fuel tank 114 to the stack 240 when open. The contents of the fuel tank 114 can be vented through the stack 240 to the atmosphere as indicated by the arrow A in FIG. 1.

In embodiments, the controller 254 determines a temperature at a location of thermal event by processing signals from the heat detector. In embodiments, the controller 254 receives a temperature at a location of thermal event from another device. The controller can confirm a thermal event using the temperature at a location of potential thermal event. In embodiments, the controller confirms a thermal event when a detected temperature exceeds a threshold temperature. In certain embodiments, the controller confirms a thermal event when the temperature exceeds a threshold temperature longer than a threshold time period. The threshold temperature can be 90, 100, 110, 120, 130, 140, 150, 160, 170, 180, 190, or 200 degree Fahrenheit. The threshold temperature can be a temperature between two of the above listed temperature. In certain embodiment, the threshold temperature can be higher than 200 degree Fahrenheit or lower than 90 degree Fahrenheit. The threshold time period can be 1.0, 2.0, 3.0, 5.0, 10, 15, 20, 60, 100 seconds. The threshold time period can be a time period between two of the above listed periods. In certain embodiment, the threshold time period can be longer than 100 seconds or shorter than 1.0 second.

The thermal event management system 200 can be powered in any of a variety of sources and in some cases a plurality of sources. For example, vehicle power 272 can be used to power one or more of the controller 254, the signal conditioner 258, the vent system 260, the valve 262. In some examples the vehicle power 272 provides current for the heat detector 250. The vehicle power 272 can include a current source, e.g., one or more batteries, that is or are dedicated to powering the thermal event management system 200. The vehicle power 272 can include a battery or other current source that is coupled with and powers other components of the vehicle 100. In some cases, back-up power 274 can be provided to operate the controller and to continue to monitor temperature and operate the vent system 260 and the valve 262 as needed even if the vehicle power 272 is not available. For example if the vehicle battery normally used to start the engine of the vehicle becomes drained or fails, the thermal event management system 200 can still be operational.

In some implementations it is beneficial to provide information directly to the driver or occupants of the cab. In one case, a communication system 280 is provided that informs the cab occupant(s) of current condition or of the existence of a thermal event. For example, the communication system 280 can include a gauge built into the dashboard that can continuously display a temperature of the fuel tank 114 as measured by the thermal event management system 200. The communication system 280 can include a gauge that is part of the fuel system 110 but need not be built into the dashboard. For example, a fuel system gauge can be part of a mobile computing device to which the driver can refer, e.g., a tablet computer, a cell phone, or other device that is separate from the vehicle but able to be positioned in the cab. In some implementations, the thermal event management system 200 only measures temperature above a threshold. So, the communication system 280 can communicate a simple message such as illuminating a word such as NORMAL to convey that a thermal event has not been detected. If thereafter a thermal event is detected the communication system 280 can begin to display temperatures or can communicate escalating warnings or other driver instructions indicating what countermeasures are being taken by the thermal event management system 200 or should be taken by the driver.

The controller 254 can be part of, integrated into or in communication with a higher level engine control unit that controls the operation of the engine and information to the driver. The controller 254 can thus convey messages to a driver interface 286. The driver interface 286 can include fuel system specific information and can convey information related to thermal events in addition to those communicated via the communication system 280. Accordingly, the controller 254 can communicate directly or indirectly engine control outputs 288. Such output could modulate the operation of the engine before, during or after a thermal event.

The thermal event management system 200 also can be configured to output an alarm if any component of the fuel system 110 begins to leak. For example, if the fuel tank 114 should begin to leak at any point the concentration of methane inside the cover 120 can begin to increase. The level of methane can be sensed in some applications by a methane sensor 281. If the methane level detected by the sensor 281 is excessive, an alarm 282 can be triggered. The alarm 282 can be atone or a spoken message such as "METHANE DETECTED—EXIT THE VEHICLE". The alarm 282 also can be configured to generate instructions for manual countermeasures such as "METHANE DETECTED—ACTIVATE MANUAL VENT". In some cases, a wireless vent system can be provided that can be actuated by emergency response personnel. Accordingly the thermal event management system 200 can include a wireless actuator 284 that can be actuated remotely by emergency response personnel. The wireless actuator 284 can also be configured to broadcast a status to emergency response personnel, such as "EMERGENCY THERMAL EVENT—ACTIVATE WIRELESS VENTING".

A telematics device 290 can be provided in some embodiments. The telematics device 290 can be capable of cellular, satellite or other telecommunications with remote sites. The telematics device 290 can be used to convey messages related to thermal events to remote emergency personnel, such as to alert fire department or hazardous materials specialist to the location of the vehicle 100. The telematics device 290 can convey thermal event information to a fleet management center that tracks the vehicle 100. The telematics device 290 can convey a continuous stream of temperature information to a fleet management center, which can contact the driver for real-time consultation of potential, impending or actual thermal events and countermeasures.

The controller 254 also can process thermal event information to select among a plurality of appropriate countermeasures. For example, the controller 254 can determine that a thermal event includes a fire on the vehicle 100 but away from the fuel tank 114. In some cases, the controller 254 can elect to activate a fire suppression system 300 that can enhance the thermal isolation of the fuel tank 114 from the fire. The fire suppression system 300 can include a fire extinguisher system including a sprayer and a container of fire retardant to be sprayed by the sprayer onto the location of the thermal event. The fire suppression system 300 could be effective in some circumstances to extinguish the fire, enabling continued operation of the vehicle 100 for an appropriate additional amount of time, e.g., to exit the road or reach a nearby service center. In some cases, the fire suppression system 300 is not able to extinguish the fire but can enable the driver to maneuver the vehicle 100 to a safe distance from other vehicles so that other countermeasures can be implemented by the controller 254. More critical thermal events may call for multiple countermeasures, such as activating the fire suppression system 300 and the vent system 260.

FIG. 2A shows that the digital heat detector 250 is generally disposed around the fuel tank 114. It is desired to provide as much warning as possible in the case of a thermal event so that the controller 254 can implement the safest countermeasures available. For this reason, the heat detector 250 can be mounted in a space that is expected to have the same temperature as any component that could be compromised by fire or other thermal event. In some cases, the fuel system 110 is configured to isolate the fuel tanks 114 from external heat sources. For example, the cover 120 can be configured as or can have an insulation layer disposed therein around the fuel tank(s) 114. The cover 120 can be configured as or can have a fire barrier disposed therein around the fuel tank(s) 114. In these arrangements, the linear heat detector 250 should be mounted within the insulation and/or within the fire barrier such that the fuel tank 114 is not vented in the case of high heat outside the cover 120 but normal or not excessive temperatures inside the cover 120.

Figure 2B:
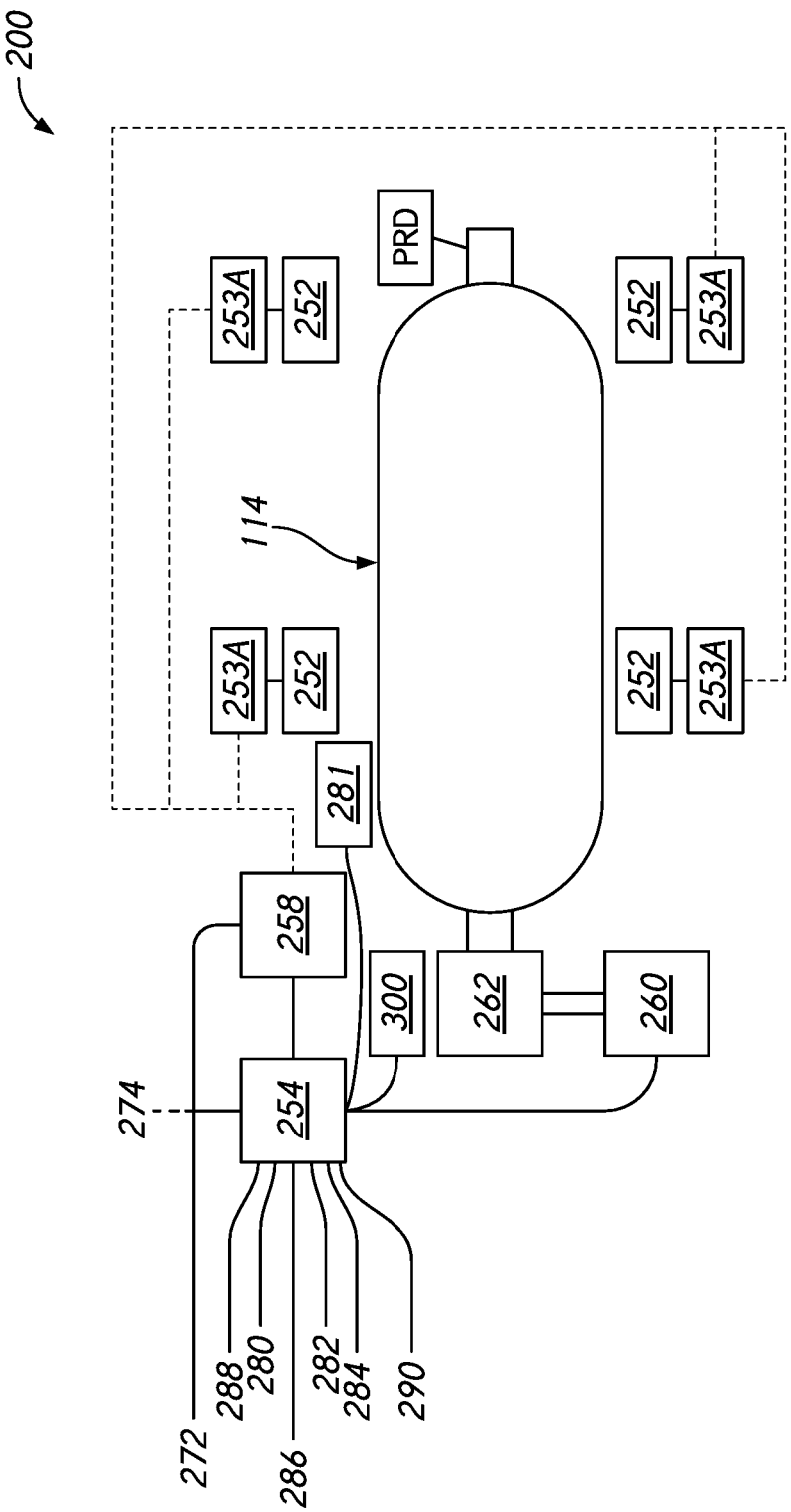
FIG. 2B is a schematic diagram of another embodiment of a heat detector for a vehicle fuel system.
Figure 2C:
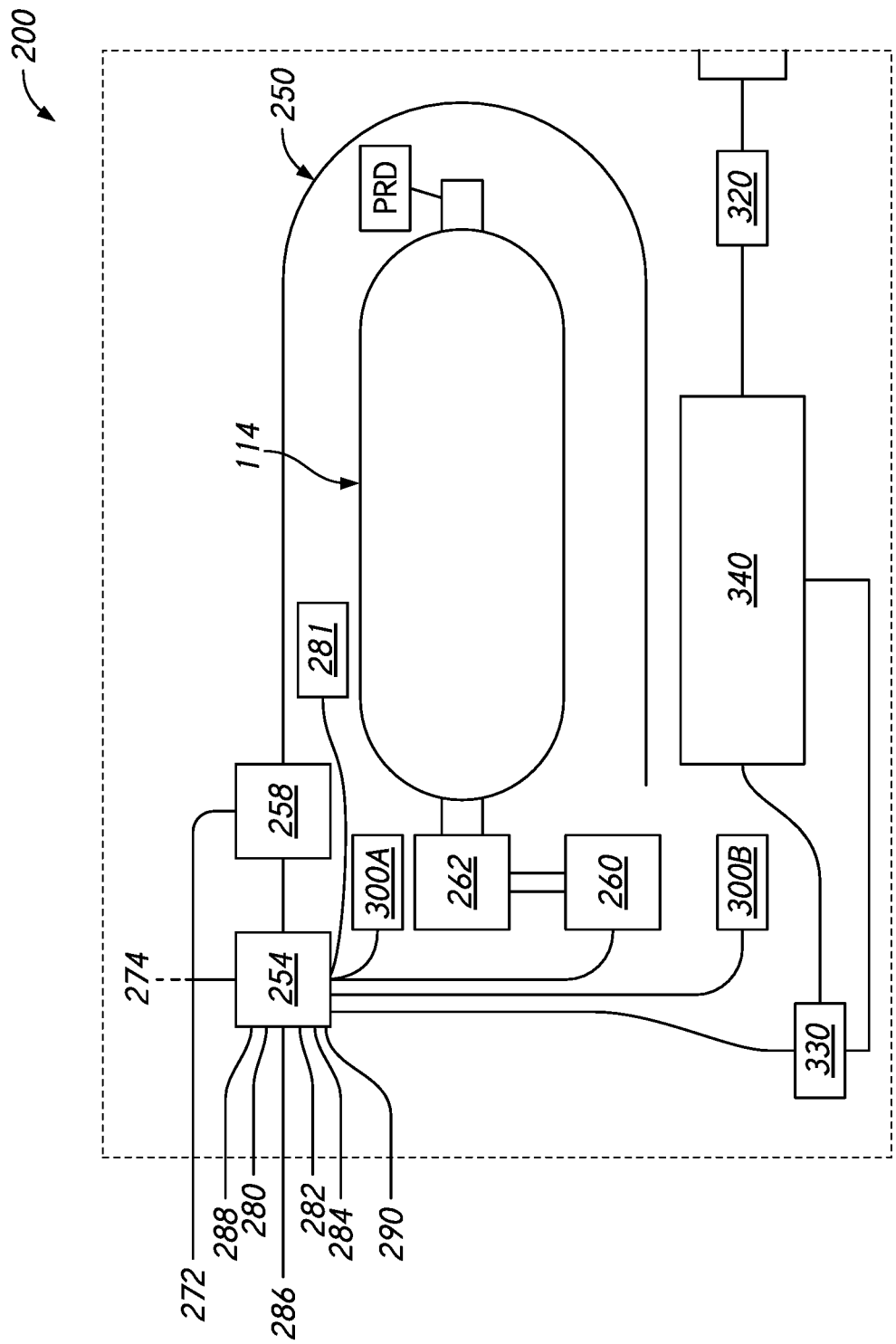
FIG. 2C is a schematic diagram of another embodiment of a heat detector for a hybrid fuel system having a fuel tank and a battery.

FIG. 2C illustrates an embodiment of a linear heat detector applied to a hybrid fuel system. In embodiments, the linear heat detector can be implemented as a digital heat detector. The thermal event management system 200 of FIG. 2C includes a fuel tank 114, a battery assembly 340, a heat detector 250 disposed in proximity to the tank 114 and to the battery assembly 340. The system 200 further includes a controller 254 that is connected to the heat detector 250 via a signal conditioner 258 and identifies a thermal event based on the signals from the heat detector 250.

The system 200 of FIG. 2C further includes a tank heat suppression system 300A, a battery assembly heat suppression system 300B, a heat pump 330 (e.g., a radiator or fan, coolant lines, or the like). In embodiments the heat suppression systems 300A, 300B can include at least one fire extinguisher device that can deploy thermal abatement mediums onto or around the tank 114 and/or the battery assembly 340. In embodiments, in response to a thermal event about the fuel tank 114 and/or the battery assembly 340, the controller 254 activates at least one of the tank heat suppression system 300A, the battery assembly heat suppression system 300B, and the heat pump 330.

The system 200 of FIG. 2C further includes a port 320 for providing electrical connections to the battery assembly 340. The port 320 comprises at least one circuit for charging/discharging the battery assembly 340. In certain embodiments, in response to a thermal event about the fuel tank 114 and/or the battery assembly 340, the controller 254 connects or disconnects at least one circuit of the port 320 as one thermal countermeasure. In certain embodiments, the controller 254 controls the port 320 to slow charging/discharging of the battery assembly 340 as another countermeasure in response to a thermal event in connection with the fuel tank 114 and/or the battery assembly 340. In some embodiments, the ports 320 can be fuel receptacle inlets and/or electrical connections, such as alternating current (AC) and/or direct current (DC) connections. In some embodiments, the battery assembly 340 can include the AC and/or DC charging connection. In some embodiments, the battery assembly 340 can include a DC-AC inverter to power certain stationary equipment, such as auxiliary 100, 220, and/or 440 VAC devices, and/or interface with a power grid, among other things. In some embodiments, the electrical connections or ports 320 can be configured to allow for slow and/or fast charging. In some embodiments, the battery assembly 340 can include a step-down and/or a step-up DC-DC converter to power lower voltage chassis electronics, such as 12V, 24V, and/or 48V system components, or other auxiliary or APU loads, such as heating and/or cooling a vehicle's passenger compartment. The ports 320 can be positioned on any portion of an enclosure of the battery assembly. In some embodiments, the ports 320 can be positioned on an external surface of the enclosure of the battery assembly 340. In certain embodiments, when the system 200 of FIG. 2C is applied to a vehicle, the battery assembly 340 and the fuel tank 114 are contained within a same housing separate from the vehicle body.

In various embodiments, an escalating set of countermeasures can be deployed. For example, if the controller 254 uncovers a thermal event in or about the battery assembly 340 upon processing the signals of the linear heat detector 250, the controller can initially modify the operation of the heat pump 330 to remove more heat from the battery assembly 340. If the controller 254 does not confirm sufficient reduction in heat in or about the battery assembly 340, the controller 254 can reduce the flow of charging current into the battery assembly 340. If upon increasing heat removal by the heat pump 330 and reducing charging current into the battery assembly 340, the controller 254 does not confirm sufficient reduction in heat in or about the battery assembly, the controller 254 can deploy one or both of the tank heat suppression system 300A or the battery assembly heat suppression system 300B.

Figure 2D:
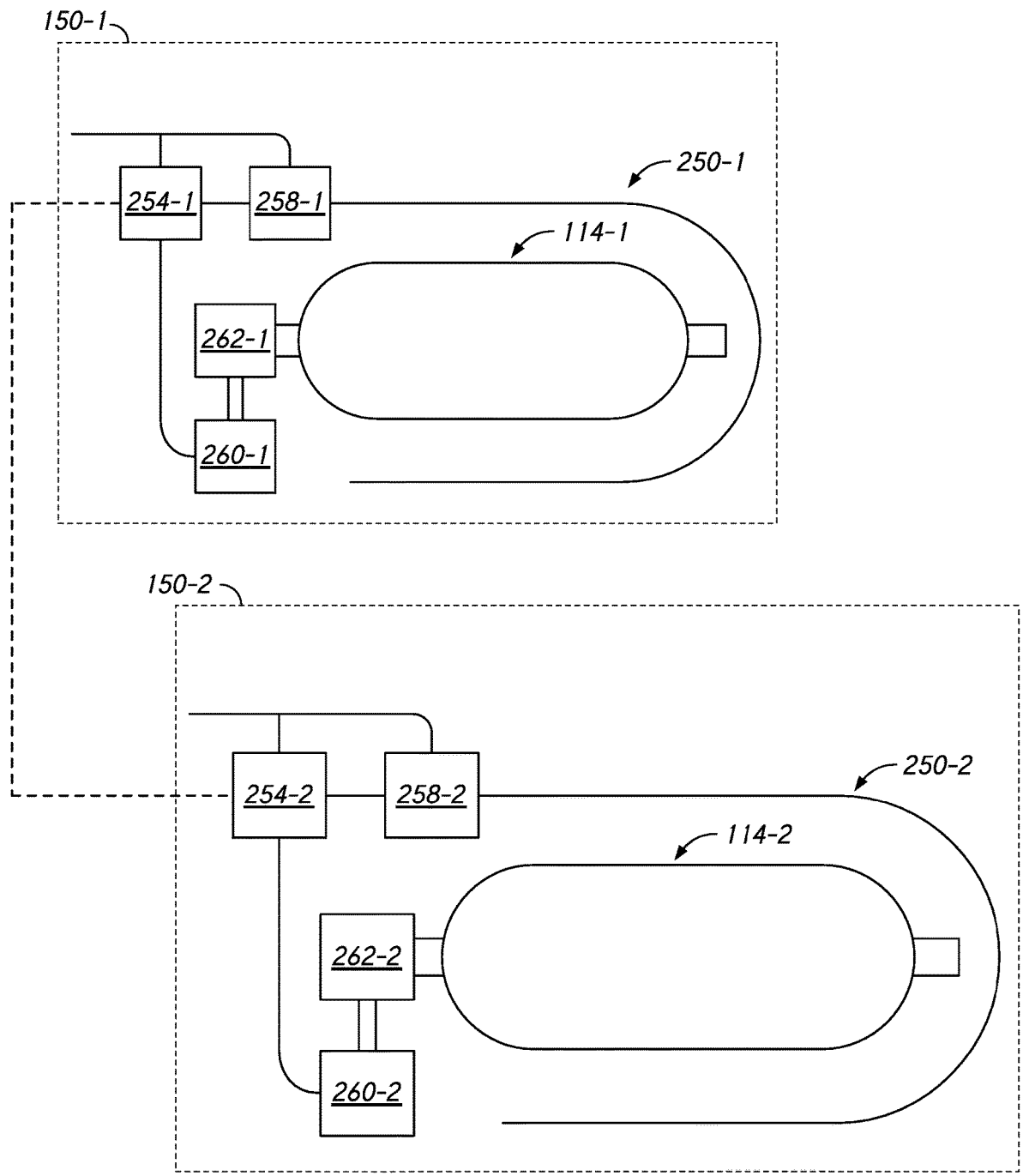
FIG. 2D is a schematic diagram of another embodiment for a fuel system that has two fuel tanks each incorporating the heat detector of FIG. 2A.

FIG. 2D shows a fuel system that has two fuel tanks 114-1, 114-2 each incorporating a heat detector. In embodiments, the fuel system comprises a first thermal event management system 150-1 for the first fuel tanks 114-1 and a second thermal event management system 150-2 for the second fuel tanks 114-2. In the first thermal event management system 150-1, a first heat detector 250-1 is configured to sense heat in proximity to the first fuel tank 114-1. A first controller 254-1 is connected to the first heat detector 250-1 via a first signal conditioner 258-1 and identifies a thermal event based on the signals from the first heat detector 250-1. The first controller 254-1 is coupled with a first vent system 260-1. The first vent system 260-1 can include a solenoid or other actuator that initiates the opening of a first valve 262-1. In the second thermal event management system 250-2, a second heat detector 250-2 is provided to sense heat in proximity to the second fuel tank 114-2. A second controller 254-2 is connected to the second heat detector 250-2 via a second signal conditioner 258-2 and identifies a thermal event based on the signals from the second heat detector 250-2. The second controller 254-2 is coupled with a first vent system 260-2 that includes a solenoid or other actuator for opening and closing of a second valve 262-2. In embodiments, the two thermal event management systems 150-1, 150-2 operates independently. In embodiments, the two thermal event management systems 150-1, 150-2 uses at least one common components. In certain embodiments, a common controller is connected to the two heat detectors 250-1, 250-2 for opening/closing the two valves 262-1, 262-2.

The controllers 254-1 and 254-2 or other processor such as an electronic control unit (ECU) of the fuel system 110 are examples of control circuits that can be used to operate an emergency countermeasure. A switch can also be used as a control circuit for operating emergency countermeasure components of the systems 150-1, 150-2. A switch can replace or be integrated into one or both of the signal conditioner 258-1, 258-2. A switch can connect the heat detector 250-1 to the vent 260-1, to the valve 262-1 or to both the vent 260-1 and the valve 262-1. A switch can connect the heat detector 250-2 to the vent 260-2, to the valve 262-2 or to both the vent 260-2 and the valve 262-2.

Figure 3:
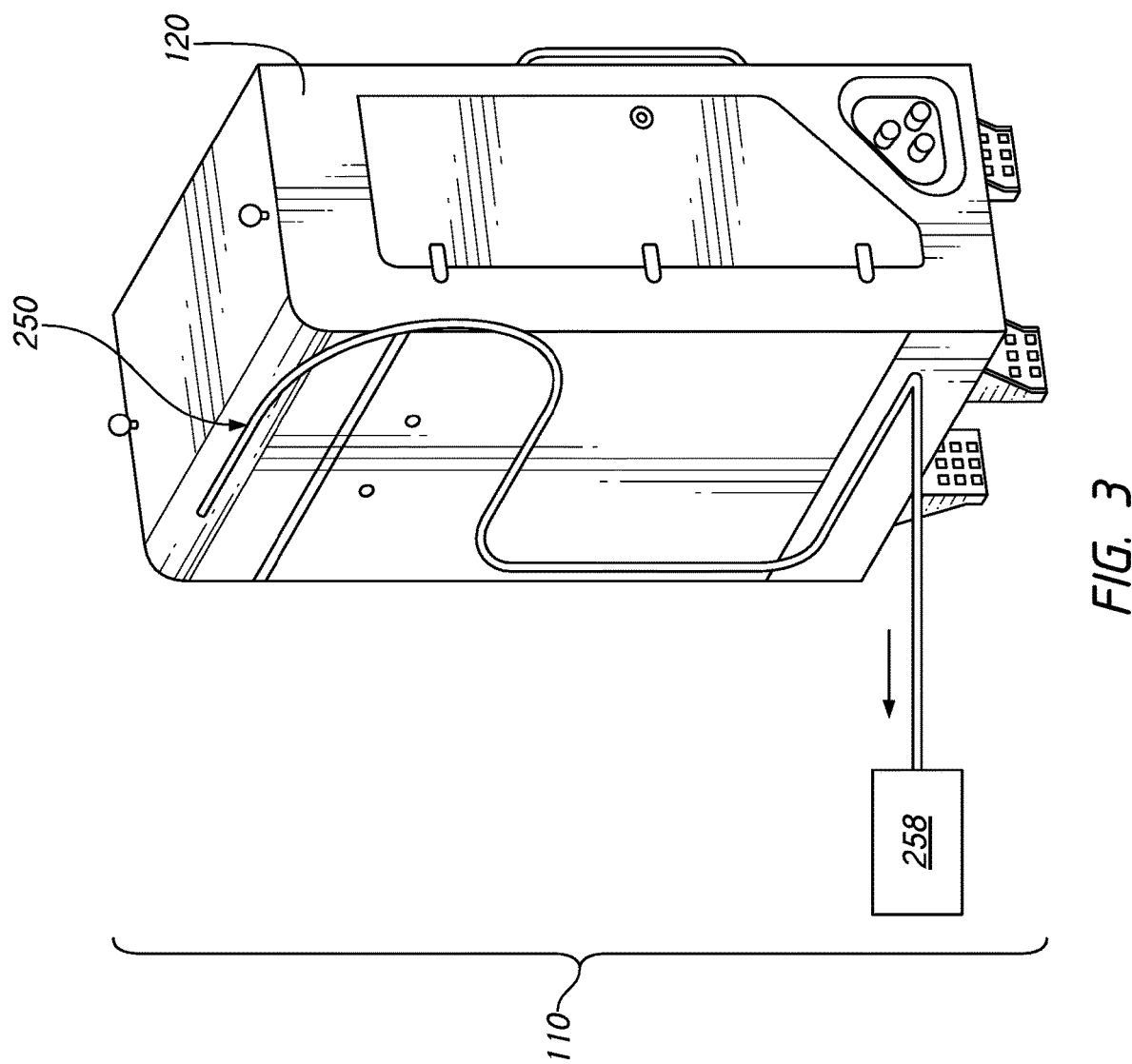
FIG. 3 is an example implementation of a back-of-cab fuel system incorporating the heat detector of FIG. 2A.
Figure 4:
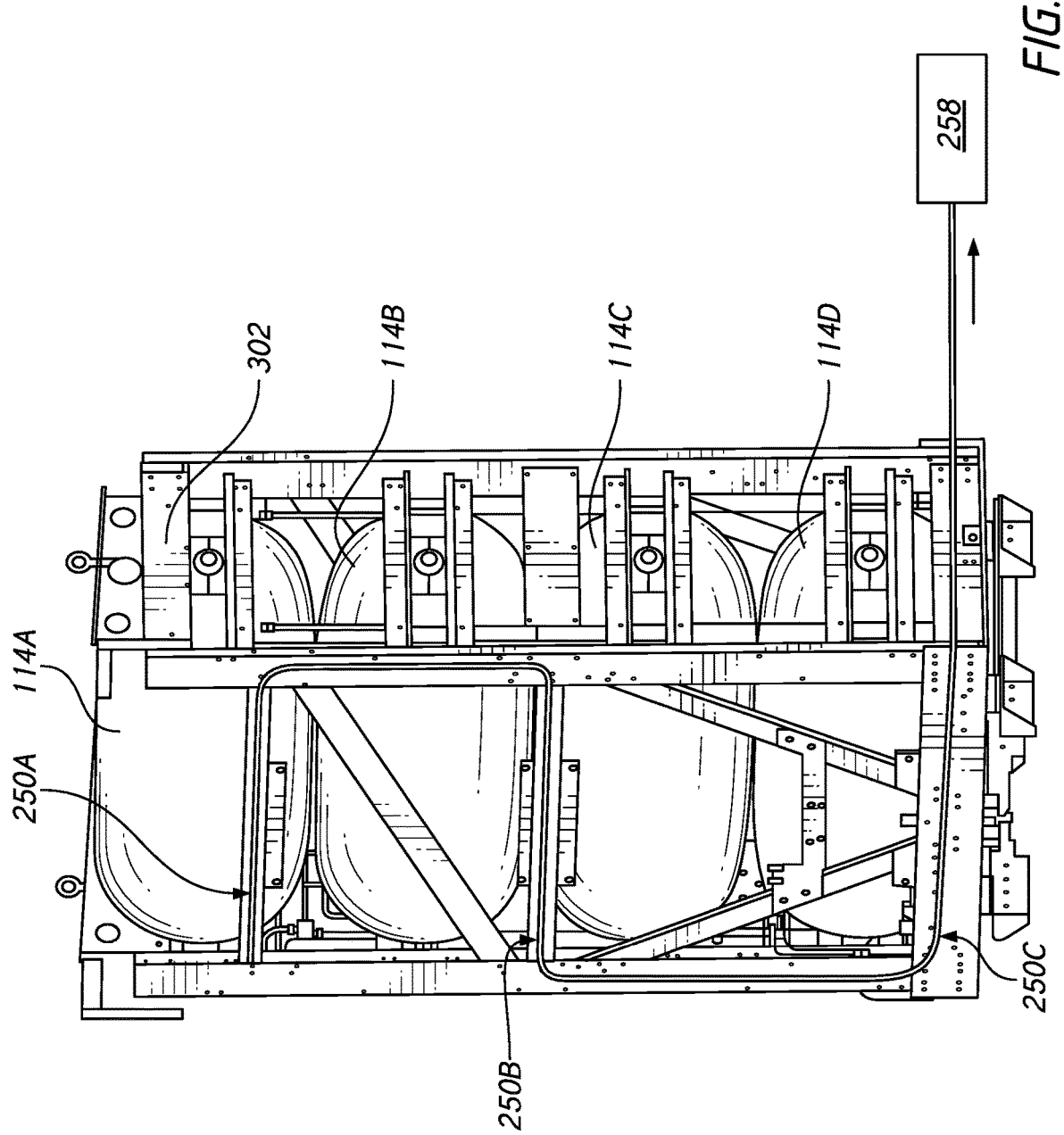
FIG. 4 is another example of a back-of-cab fuel system incorporating the heat detector of FIG. 2A.

FIGS. 3 and 4 show that the fuel system 110 can be configured as a back-of-cab system. The heat detector 250 can be located inside the cover 120. The heat detector 250 can be mounted to the inside surface of the cover 120. The heat detector 250 can be mounted in a space between the inside surface of the cover 120 and a frame 302 configured to support the fuel tank(s) 114. The heat detector 250 can be mounted on an outside surface of the frame 302, e.g., facing toward the cover 120 and away from the fuel tank 114. The heat detector 250 can be mounted on an inside surface of the frame 302, e.g., facing toward the fuel tank 114.

FIG. 3 shows that in some embodiments the thermal event management system 200 can be partly located on or in the cover 120 and partially located outside the cover of the fuel system 110. For example, the heat detector 250 can be located on or in the cover 120 but the signal conditioner 258 can be located outside the cover 120, e.g., integrated into a vehicle electronic control unit located in or around the cab C.

FIGS. 3 and 4 show that the heat detector 250 can be arranged with a first portion 250A disposed along a longitudinal axis of a first tank 114A, a second portion 250B disposed generally parallel to but between second and third tanks 114B, 114C, and a third portion 250C disposed along a fourth tank 114D. FIG. 4 shows that the portions 250A, 250B, 250C can be lengths of one continuous heat detector 250. In some embodiments, the portions 250A. 250B, 250C can be detectors that each generates a separate signal to the controller 254. In certain embodiments, the heat detector 250 is installed such that a single continuous strip or portion of the heat detector 250 overlaps with two or more of the fuel tanks 114A-114D. In certain embodiments, the heat detector 250 is attached to an inner surface of a frame (or housing)

for holding the fuel tanks 114A-114D such that at least a portion of the heat detector is interposed between the frame and at least one of the fuel tanks.

The heat detector 250 is illustrated as having a serpentine configuration enabling a single linear member to be disposed along a plurality of tanks 114. FIG. 4 shows that the heat detector 250 can be located on one side portion, e.g., a rear-facing side, of the frame 302. In some embodiments, the heat detector 250 can be located on a front portion, e.g., a front-facing side, of the frame 302. The heat detector 250 also can be disposed on both to the rear of the fuel tanks 114 and forward of the fuel tanks 114, e.g., on a rear facing portion and a front facing portion of the frame 302. For example, a length of the heat detector 250 connecting any two of the portions 250A, 250B, and 250C can span from a front facing side to a rear facing side or can span from a rear facing side to a front facing side.

Figure 5A:
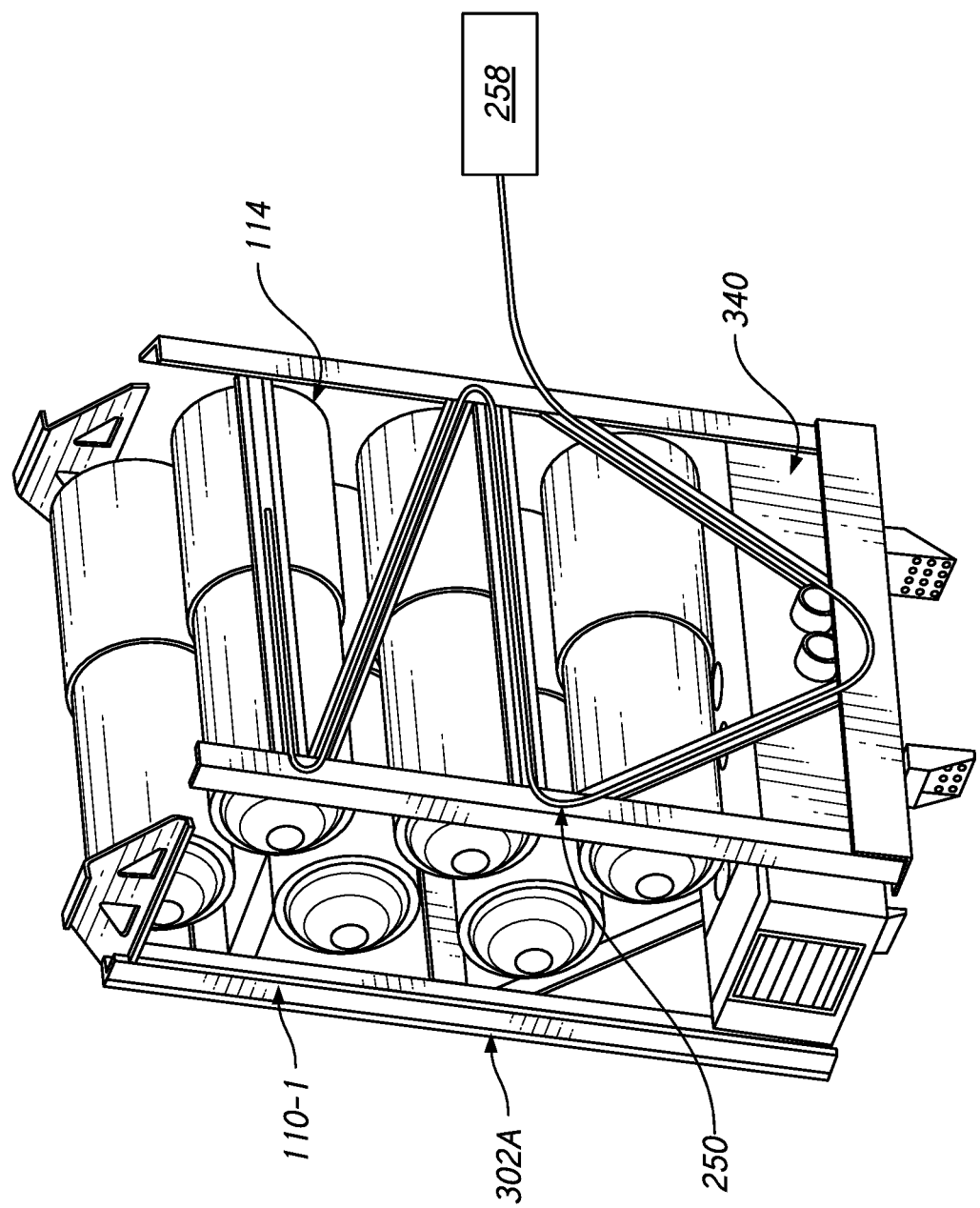
FIGS. 5A and 5B illustrate an embodiment of a heat detector applied to a hybrid fuel system.

FIG. 5A illustrates an embodiment of a heat detector applied to a hybrid fuel system 110-1 having at least one fuel tank 114 and at least one battery assembly 340. The hybrid fuel system 110-1 includes at least one frame (housing or enclosure) 302A for holding the fuel tank 114 and the battery assembly 340. A single heat detector 250 can be installed along the at least one frame 302A. The detector 250 can detect a thermal event in or about the fuel tank 114 and the assembly 340. As discussed in connection with FIG. 2C, a signal conditioner 258 is provided to connect the heat detector 250 and the controller 254 of the thermal event management system.

Figure 5B:
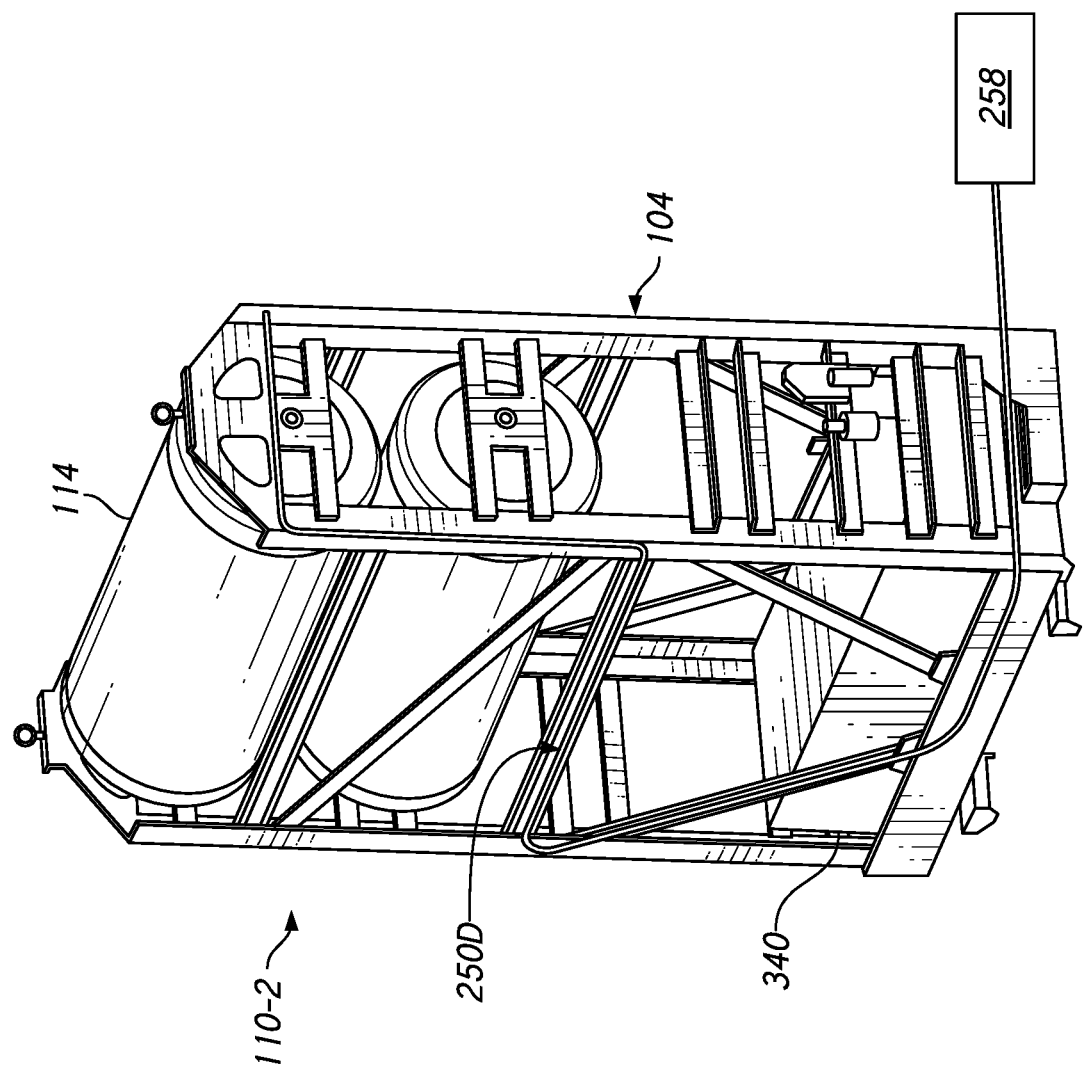

FIG. 5B illustrates an embodiment of a heat detector applied to a hybrid fuel system 110-2. At least one portion 250D of the heat detector is interposed between the fuel tank 114 and the battery assembly 340 along a horizontal direction. The detector 250 can thus sense an elevation of temperature due to charging or other operation of or malfunction of the battery assembly 340. This enables the controller 254 to implement a safety countermeasure, which can include one or more of increasing heat removing capacity of a heat pump, reducing or ceasing charging, deploying a thermal abatement medium such as a fire retardant, and/or venting the fuel tank(s) 114. The portion 250D can be coupled with other portions of the detector 250 that are in intimate contact with the battery assembly 340, e.g., contacting an outside surface of a housing of the assembly 340. The detector 250 can be in contact with multiple surfaces of the battery assembly 340. The detector 250 can be routed over the highest heat generating portion of the battery assembly 340, e.g., over an array of battery cells.

Figure 6:
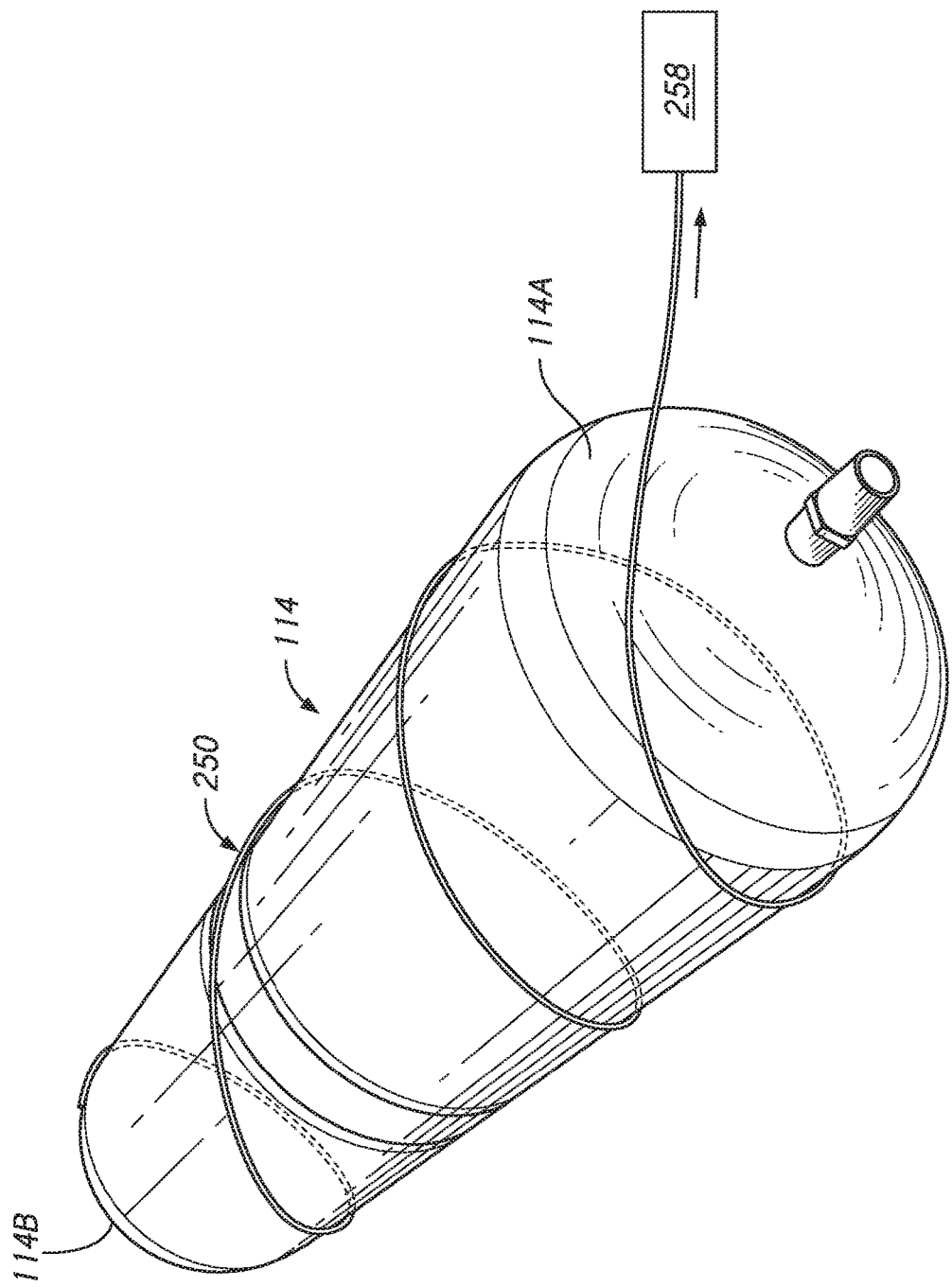
FIG. 6 is an example of a fuel tank and a heat detector similar to that of FIG. 2A.

FIG. 6 shows that in other embodiments the heat detector 250 can be disposed around one or more of the fuel tanks 114, e.g., around each tank 114. The heat detector 250 can include a first portion that spans between the signal conditioner 258 and the fuel tank 114 and that comes into contact with a first end 114A of the fuel tank 114. The heat detector 250 then wraps around the fuel tank 114 along the length of the fuel tank 114 to a second end 114B of the fuel tank 114. In other embodiments the heat detector 250 is in direct contact with an outside surface of the fuel tank(s) 114. The heat detector 250 can extend along the fuel tank(s) 114 without wrapping around the fuel tank(s).

Although certain technologies for the heat detector 250 can sense temperature along a continuous span, other technologies also can be used that provide discrete location temperature sensing. For example, FIG. 2B shows the heat detector can include a plurality of discrete point sensors 252. Examples of such sensors can include infrared sensors, vision sensors, smoke detectors, and other sensors that can sense heat or fire at a plurality of discrete spaced part locations. The sensors 252 can be coupled with transmitters 253A that send heat information to a wireless receiver coupled with the controller 254 or the signal conditioner 258. In other embodiments the sensors 252 communicate by wires to the controller 254. The sensors 252 can be mounted to the inside surface of the cover 120. The sensors 252 can be mounted to portions of the frame 302. Where communicating wirelessly with the controller 254 the sensors 252 can be mounted anywhere inside the cover 120 or to the frame 302.

FIGS. 7-12 illustrate further variations in which the thermal event management system 200 can be provided in other configurations of a fuel system. FIG. 7 illustrates a variation of a side-mount fuel system 110A which is configured to enable a fuel tank to be mounted to a side portion of a vehicle, e.g., directly to a side portion of a vehicle frame rail. A cover 120A that surrounds a single tank (not shown) is generally cylindrical, larger than but generally matching the shape of the fuel tank. The thermal event management system 200 can be disposed within, coupled to, or integrated into the cover 120A. The system 200 can include the heat detector device 250 with a first end coupled with the signal conditioner 258 and a length disposed away from the first end to the second end of the heat detector device 250 disposed along or wrapped around the fuel tank as discussed above. The signal conditioner 258 and in some cases the controller 254 can be located inside or outside of the cover 120A.

FIG. 8 shows that in some embodiments the fuel system 110A can support the fuel tank using a support assembly 402. The support assembly 402 can include one or a plurality of straps 404. The straps 404 can be metal or other high strength strips that can extend around a fuel tank and that can be cinched to securely hold the fuel tank. The straps 404 can be joined to a bracket system 406 that can be configured to mount to a side portion of a frame rail as discussed above. The support assembly 402 provides several opportunities for convenient integration of the heat detector device 250 into the fuel system 110A. For example, clips (discussed below in connection with FIG. 10) can be integrated into the bracket system 406. Because the bracket system 406 must be strong enough to support the weight of the fuel tank (similar to the fuel tank 114 discussed above) the bracket system provides excellent stability for the clips. The bracket system 406 provides support for one or more lengths of the heat detector device 250 along the length of the fuel tank. This allows for sensing of thermal events along the length of the fuel tank. Another approach is to couple the heat detector device 250 with the straps 404. The straps 404 are wrapped around the entire perimeter of the fuel tank so the straps 404 provide an opportunity for 360 degree coverage of the fuel tank at as many positions as there are straps. This provides for heat sensing above the fuel tank (from the cab or engine side) as well as below the fuel tank (from the road side).

FIG. 9 illustrates a roof-mounted fuel system 110B. The system 110B can be similar to the system 110 or the system 110A except as described differently below. The system 110B includes a support system 502 that includes a frame 506 and a plurality of straps 504. The frame 506 can include a plurality of rigid plates, flanges or angles. The system 502 can be provided with at least two straps 504 for each fuel tank. One common use of a roof-mounted system is for garbage trucks. One issue that can arise in garbage trucks is a fire in the load. A fire in the load will cause heat which will rise toward the roof-top and eventually heat the fuel system 110B. While insulation is sometimes provided in a roof-top system, if the fire is hot enough the insulation can be breached causing a thermal event that can be dangerous. The thermal event management system 200 provides an added level of safety for this condition. To provide the most time for countermeasures it may be desirable to locate some or all of the thermal event management system 200 between the vehicle and the fuel tanks, e.g., on the lower or under side of the fuel system 110B. If there is little to no insulation between the fuel tank and the vehicle, it may be desirable to locate the heat detector device 250 on the outside of a cover disposed about the fuel system 110B. This will allow for heat detection in the heat detector device 250 to commence and to give more lead time for appropriate countermeasures because the heat detector device 250 will be more sensitive to thermal events arising from the vehicle which is beneath the fuel system 110B, e.g., more sensitive to fire in a garbage truck load.

If insulation or other thermal barrier is provided between the fuel tanks and the vehicle it may be preferable to place the heat detector device 250 within the cover that envelops the fuel tanks. The heat detector device 250 can be placed between the insulation or thermal barrier and the fuel tanks to give greater assurance that the temperature detected by the heat detector device 250 accurately reflects the temperature within the fuel system 110B, e.g., of the fuel tanks. The heat detector device 250 can be mounted between the frame 506 and the straps 504 (within which the fuel tanks are mounted).

FIG. 9 shows a four tank example in which the heat detector device 250 is routed under and in proximity to each of the four tanks. A first portion 250A of the heat detector 250 is disposed between a lateral most tank and the lateral side of the fuel system 110B (and also the vehicle). A second portion 250B of the heat detector 250 can be arranged between two middle tanks, e.g., generally along a vertical forward-backward mid-plane of the fuel system 110B. A third span 250C of the heat detector 250 can be arranged between the other lateral most tank and the other lateral side of the fuel system 110B (and also the vehicle).

Figure 10:
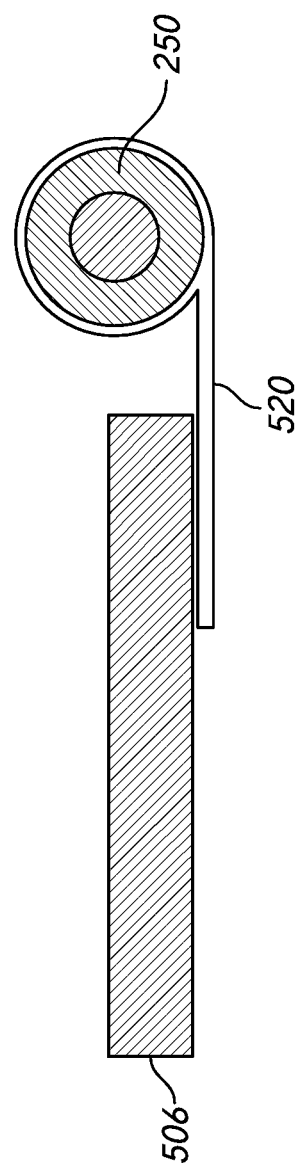
FIG. 10 illustrates one technique for coupling a linear heat detector device to a frame member of the roof-top mountable fuel system of FIG. 9 but also being applicable to any of the fuel systems disclosed herein.

FIG. 10 illustrates a cross-section taken by an imaginary plane 10-10 in FIG. 9 to show an example of how the heat detector 250 can be integrated into the roof mounted fuel system 110B. However, the technique for integrating the heat detector 250 can apply to any of the other fuel systems. A clip 520 can be provided to hold the heat detector 250. The clip 520 can have a transverse portion that can receive a short span of the heat detector 250. The clip 520 can include one or a plurality of, e.g., two end portions, that can be secured to a portion of the frame 506. The clip 520 can apply a small amount of compression of the span of the heat detector 250 in the transverse portion of the clip to prevent the heat detector 250 from moving relative to the clip or from sagging between adjacent clips. The clip 520 can be mounted to an underside of a portion of the frame 506 as shown or to another portion thereof.

FIGS. 9 and 10 show that transverse lengths of the heat detector 250 between the portions 250A. 250B. 250C connect these portions. Specifically a first transverse portion connects the first and second portions 250A, 250B. A second transverse portion connects the first and second portions 250B, 250C. This arrangement allows for the heat detector 250 to have a generally serpentine configuration of a single linear member. In other embodiments, the roof mounted fuel system 110 can have a plurality of heat detection devices that can take any shape, for example, extending straight out from the signal conditioner 258 or the controller 254. Other patterns of the heat detector 250 are also possible, for example, round or rectangular or square spirals between the fuel tanks and the possible heat source, e.g., between the bottom side of the fuel tanks and the vehicle in a roof mounted configuration.

Figure 11:
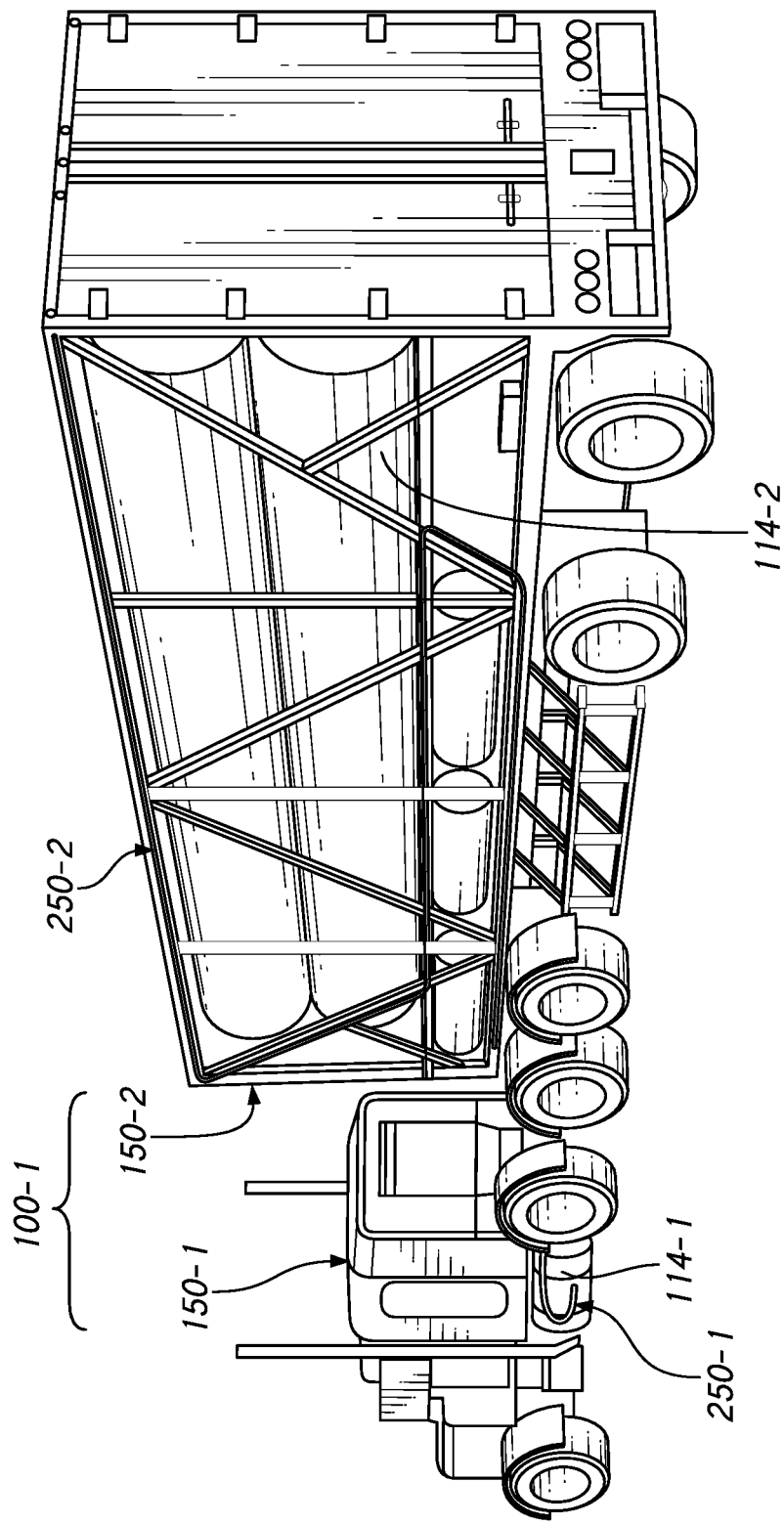
FIG. 11 illustrates a tanker truck that has two fuel tanks each incorporating a heat detector according to the embodiment of FIG. 2D.

FIG. 11 illustrates a tanker truck that has two fuel tanks respectively incorporating a heat detector according to the embodiment of FIG. 2D. The tanker truck 100-1 includes a cab unit carrying a first fuel tank 114-1 and a trailer unit carrying a second fuel tank 114-2. The tanker truck includes a first thermal event management system 150-1 comprising a first heat detector for monitoring thermal events about the first fuel tank 114-1. The tanker truck includes a second thermal event management system 150-2 comprising a second heat detector for monitoring thermal events about the second fuel tank 114-2.

In one application, a vehicle can further be configured with a volatile load to be carried from point to point along a road or to be delivered to position fuel tanks at a location temporarily. Such applications can provide a mobile pipeline for compressed fuels or a temporary fuel tank installation. Thus in such embodiments, the vehicle can have a linear heat detector 250 dedicated to monitor heat in or about the fuel tanks 114 that contain fuel to power the combustion engine of the vehicle and one or more additional linear heat detectors to monitor heat in or about supply or storage tanks (not shown). The storage tanks can be large volume, e.g., at least about 9000 liters of water volume. In other embodiments smaller volume cylinders can be used in the tanker truck 100-1, e.g., 1000 liters of water volume or more, 2000 liters of water volume or more, 3000 liters of water volume or more, 4000 liters of water volume or more, 5000 liters of water volume or more, 6000 liters of water volume or more, 7000 liters of water volume or more, or 8000 liters of water volume or more, In certain embodiment, the storage tanks includes a plurality of container cylinders to have a large volume in total, e.g., at least about 9000 liters. For example, nine cylinders each with 1000 liters of water volume. Many other combination can be provided.

Figure 12:
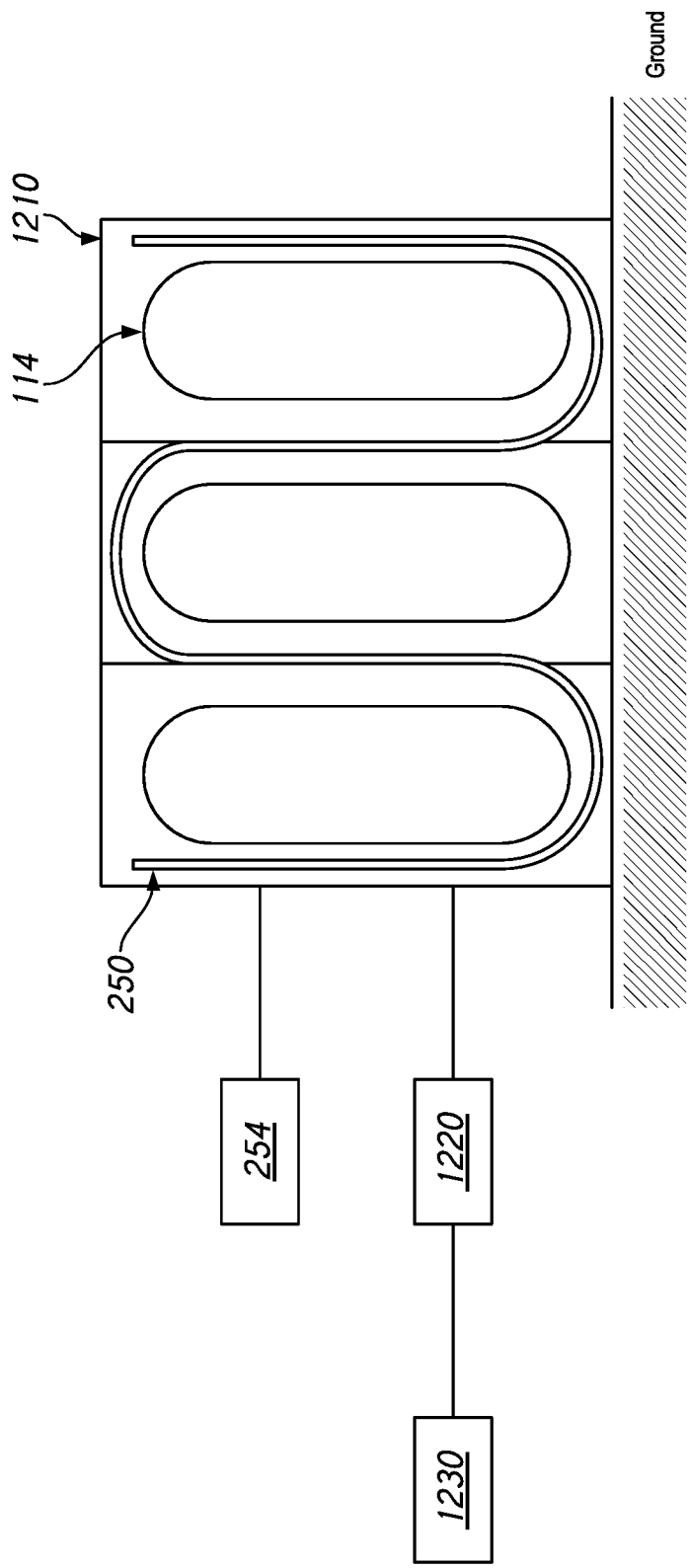
FIG. 12 illustrates a fuel system having a stationary fuel tank incorporating the heat detector of FIG. 2A.

FIG. 12 illustrates a system that is capable of operating without being coupled to external electrical power. The system includes a fuel tank 114 or an array of tanks 114 is disposed in a housing 1210 coupled to a ground surface. The fuel tanks 114 can be coupled with a combustion engine 1220. The combustion engine 1220 can be coupled with a load 1230 to perform work of any of a variety of kinds. For example, the load 1230 can include an air (or other gas) compressor. The load 1230 can include a light fixture or an array of light fixtures. The load 1230 can be operated by being coupled to an output shaft of the engine 1220. The system provides at least some of the features and advantages described above. For example, the controller 254 can process signals from the heat detector 250 and implement various thermal abatement countermeasures as discussed further below. In certain embodiments, the load 1230 includes a generator assembly configured to generate electrical current. The generator assembly comprises a rotor configured to rotate using power from the combustion engine 1220, and a stator disposed adjacent to the rotor to generate electrical current in an electrical conveyance.

Figure 13:
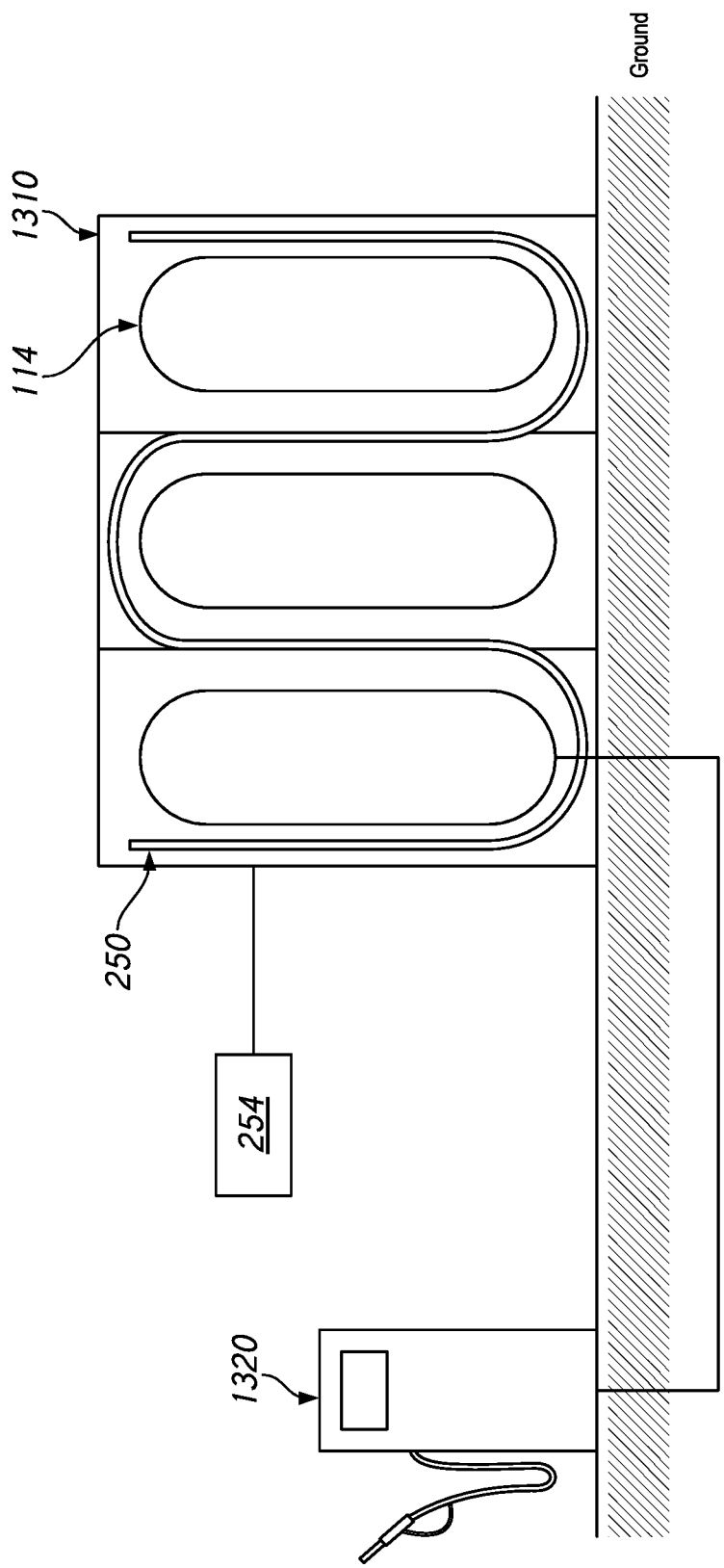
FIG. 13 illustrates a stationary fuel station incorporating the heat detector of FIG. 2A.

FIG. 13 illustrates a fuel station including a fuel dispenser 1320 connected to a fuel tank 114 or an array of tanks 114. The fuel tank(s) 114 is disposed in a housing 1310 coupled to a ground surface. The controller 254 can process signals from the heat detector 250 and implement various thermal abatement countermeasures.

Figure 14:
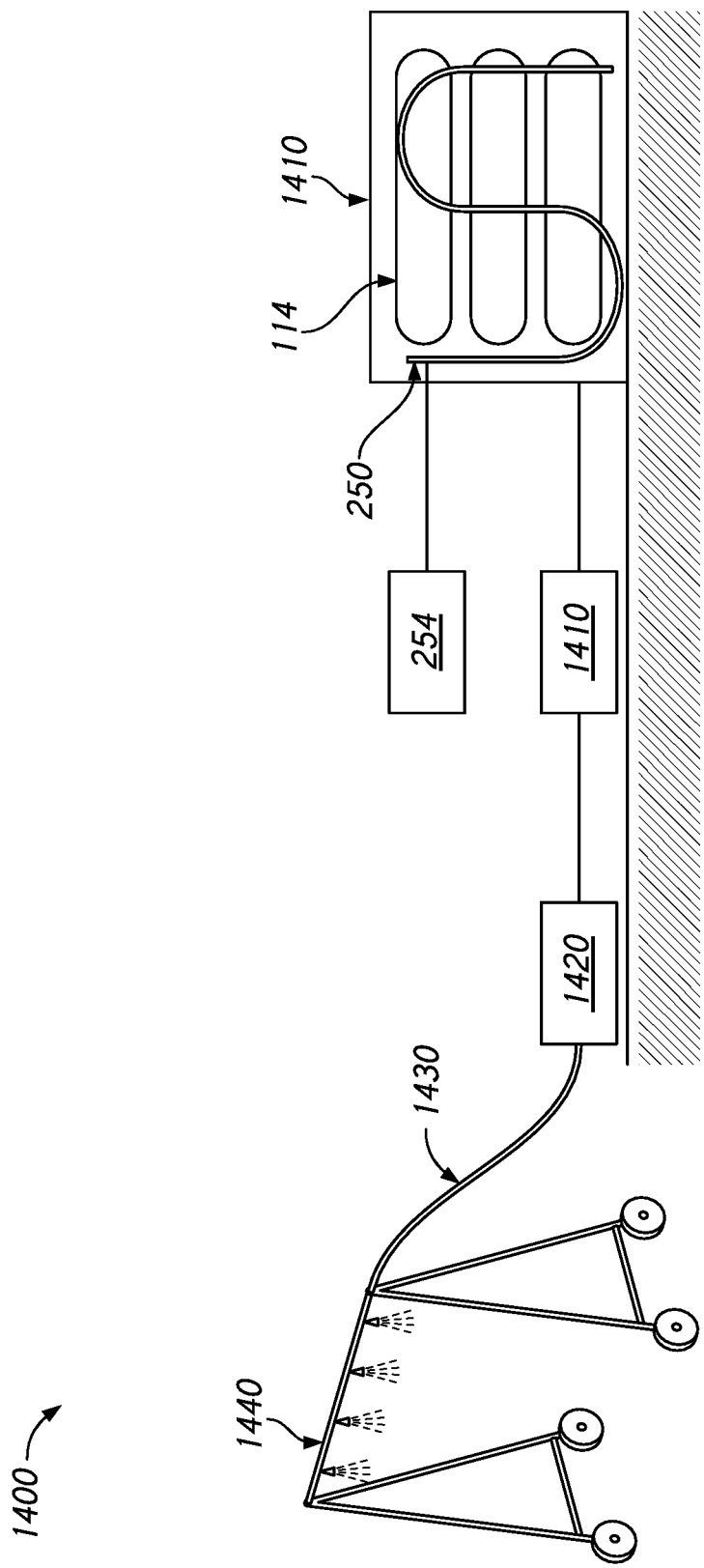
FIG. 14 illustrates an irrigation machine incorporating the heat detector of FIG. 2A.

Referring to FIG. 14, an irrigation engine 1400 comprises an engine 1410 to generate power using fuel from at least one fuel tank 114. The engine 1410 can be coupled with a pump 1420 for supplying water to spray device 1440 via at least one irrigation conduit 1430. At least one heat detector of FIG. 2A is installed in proximity to the fuel tank 114. The controller 254 can process signals from the heat detector 250 and implement various thermal abatement countermeasures.

Figure 15:
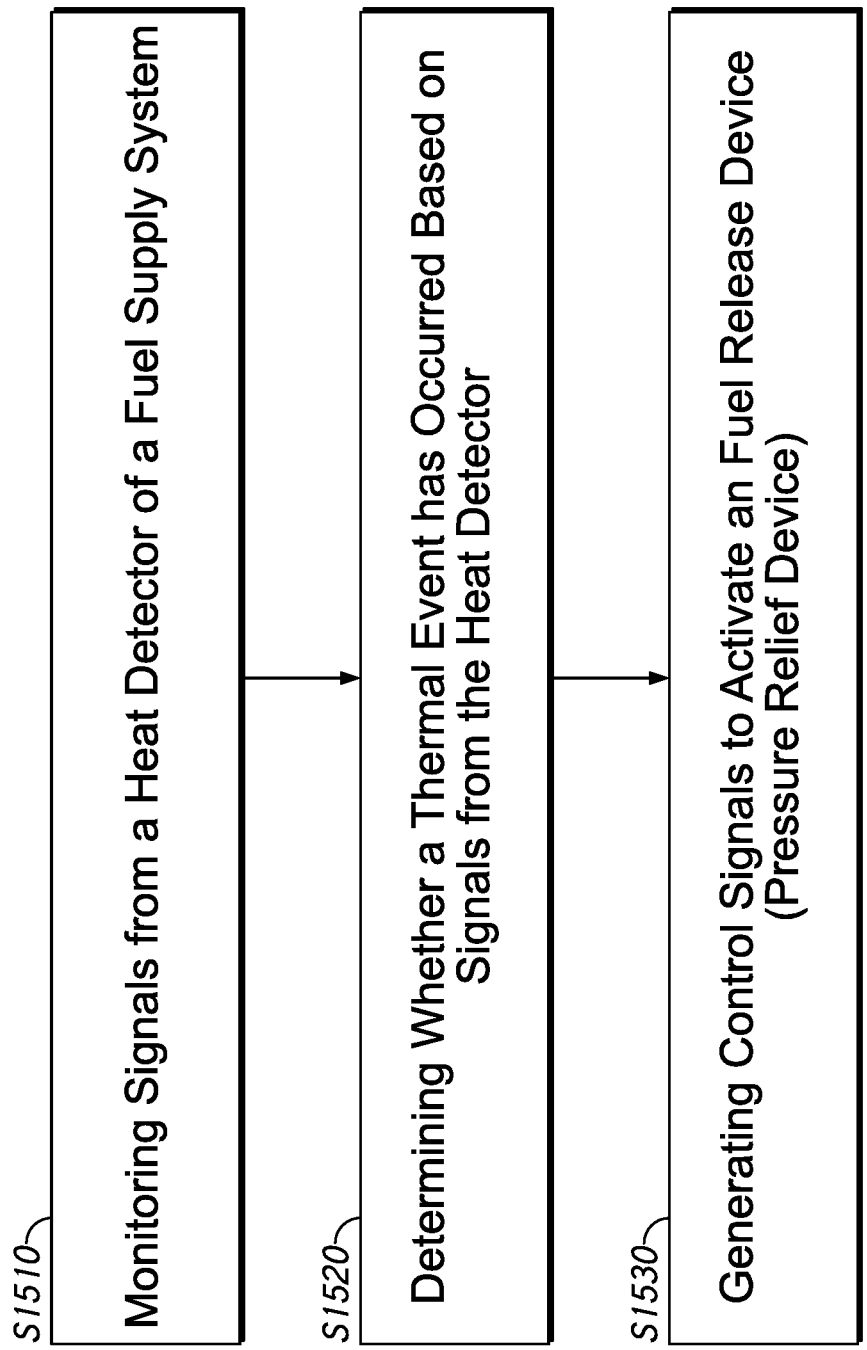
FIG. 15 is a flow chart of a fuel release process according to an embodiment of the invention.

FIG. 15 illustrates a process of emergency fuel release using a heat detector of a fuel system. In embodiments, the method comprises: (i) installing a linear heat detector to a fuel supply system. (ii) monitoring signals from the linear heat detector S1510, (iii) determining whether a thermal event has occurred based on signals from the linear heat detector S1520, and (iv) generating control signals to activate an emergency fuel release device of the fuel supply system S1530.

Logical blocks, modules or units described in connection with embodiments disclosed herein can be implemented or performed by a controller (computing device) having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Conventionally, in the event of a fire a pressure relief device is provided that is thermally activated. Because the pressure relief device relies on heat melting or otherwise altering a structure of the valve, there is a delay in the opening of the valve. A heat detector can more quickly and more accurately ascertain if an emergency countermeasure is needed, can enable selection among a plurality of such countermeasures and can thereby improve the safety of fuel systems. In the embodiments of FIGS. 1, 2A 2B and 2C, venting can be provided as one example countermeasure from the top of a stack 240 connecting the tank(s) 114 to a location above the vehicle only when there is a change in the electrical transmission along the signal line and a thermal event is confirmed as causing the change.

There have been many situations around the world where mechanical or thermally activated PRD's do not perform as intended resulting in catastrophic detonation of cylinders. Providing heat detection to confirm a thermal event and subsequently implementing a countermeasure such as venting reduces the chance of a catastrophic detonation of cylinders. For example, an appropriately trained first responder knows not to spray water on an affected tank because this can cause the PRD to freeze up, be constricted, or close. In some cases, however, first responders are not well trained or for other reasons do not follow this recommendation. A fuel system with a thermal event management system can avoid this problem by opening a venting system in addition to or in place of a PRD such that spraying water on an affected tank will not prevent venting when appropriate.

In some cases the fuel system is provided with a PRD in addition to a heat detection and response system for detecting and confirming a thermal event. The PRD and the vent system 260 can operate in coordination. For example, the controller 254 can be configured to activate the vent system 260 at a lower threshold condition (e.g., temperature or temperature and time) than the PRD. In this case, the PRD may not be activated unless the controller 254 and/or the vent system 260 fail. Alternatively, the controller 254 can activate the vent system 260 at the same threshold temperature at which the PRD is activated so that these systems operate at the same time. Other variations are possible.

The above presents a description of systems and methods contemplated for carrying out the concepts disclosed herein, and of the manner and process of making and using it, in such full, clear, concise, and exact terms as to enable any person skilled in the art to which it pertains to make and use this invention. The systems and methods disclosed herein, however, are susceptible to modifications and alternate constructions from that discussed above which are within the scope of the present disclosure. Consequently, it is not the intention to limit this disclosure to the particular embodiments disclosed. On the contrary, the intention is to cover modifications and alternate constructions coming within the spirit and scope of the disclosure as generally expressed by the following claims, which particularly point out and distinctly claim the subject matter of embodiments disclosed herein.

Although embodiments have been described and pictured in an exemplary form with a certain degree of particularity, it should be understood that the present disclosure has been made by way of example, and that numerous changes in the details of construction and combination and arrangement of parts and steps may be made without departing from the spirit and scope of the disclosure as set forth in the claims hereinafter.

What is claimed is:

1. A fuel system, comprising:
a fuel tank;
a heat detector disposed in proximity to the fuel tank; and
a control circuit coupled with the heat detector configured to detect that a thermal event has occurred;
wherein the fuel system is configured to implement an emergency countermeasure in response to the detection of the thermal event and a change in the control circuit.

2. The fuel system of claim 1, wherein the control circuit comprises a processor configured to simultaneously detect a location of the thermal event and a temperature at the location of the thermal event.

3. The fuel system of claim 1, wherein the heat detector comprises at least one of: a linear heat detection cable, a thermocouple cable, a fiber optic cable, or a plurality of discrete point sensors.

4. The fuel system of claim 1, wherein the control circuit comprises a processor configured to communicate a thermal event signal comprising one or more of: an indication of an instance of a thermal event, an identification of a heat detector affected where the system comprises a plurality of heat detectors, a location of the vehicle subject to the thermal event, a current temperature detected, an indication of degrees over ambient, a location of the thermal event, an elapsed time since the on-set of the thermal event, an estimated time until the fuel tank will fail, an estimated time until venting, an estimated time until a countermeasure is performed, or an action to be taken to mitigate the thermal event, the thermal event signal being communicated to at least one of: a gauge of a driver compartment of a vehicle on which the vehicle fuel system is deployed, a bystander, a responder, and/or remote fleet management personnel.

5. The fuel system of claim 1, further comprising a telematics device configured to:
communicate to a responder or remote fleet management, and
receive a signal from the responder or remote fleet management, the signal communicating to the fuel system to implement the emergency countermeasure in response to the detection of the thermal event.

6. The fuel system of claim 1, wherein the control circuit comprises a processor configured to activate a venting valve to cause the fuel tank to release a volume of fuel disposed therein to below a level at which the fuel tank is subject to explosive release.

7. The fuel system of claim 1, wherein the fuel system is configured to open a valve to vent the fuel tank in response to the detection of a temperature exceeding a threshold temperature during the thermal event, the fuel system further comprising a secondary pressure release device configured to vent the fuel tank to the atmosphere when a component thereof reaches a threshold temperature.

8. A method, comprising:
receiving a signal to a heat detector disposed about a high pressure or a volatile fuel tank;
confirming a thermal event has occurred; and
implementing an emergency countermeasure following confirming the thermal event.

9. The method of claim 8 further comprising simultaneously detecting a voltage in a circuit comprising first and second conductors formed of dissimilar metals and in contact at an interface and a change in resistance of the circuit comprising the first and second conductors to detect a change in current path location.

10. The method of claim 8, wherein confirming the thermal event comprises detecting a temperature using the linear heat detector and confirming that the detected temperature exceeds a threshold temperature.

11. The method of claim 10, further comprising monitoring an amount of time that the temperature exceeds the threshold temperature, wherein venting occurs upon reaching a threshold time during which the temperature exceeds the threshold temperature.

12. The fuel system of claim 1, further comprising a battery assembly, wherein the fuel tank is a combustion fuel tank, and wherein the heat detector is disposed in proximity to the fuel tank and the battery assembly.

13. A vehicle, comprising:
a fuel tank;
a heat detector disposed in proximity to the fuel tank;
a control circuit coupled with the heat detector configured to detect that a thermal event has occurred, causing an emergency countermeasure to be implemented in response to the detection of the thermal event.

14. The vehicle of claim 13, wherein the control circuit comprises a processor configured to simultaneously detect a location of the thermal event and a temperature at the location of the thermal event.

15. The vehicle of claim 13, wherein the heat detector comprises at least one of: a linear heat detection cable, a thermocouple cable, a fiber optic cable, or a plurality of discrete point sensors.

16. The vehicle of claim 13, wherein the control circuit comprises a processor configured to communicate a thermal event signal comprising one or more of an indication of an instance of a thermal event, an identification of a heat detector affected where the system comprises a plurality of heat detectors, a location of the vehicle subject to the thermal event, a current temperature detected, an indication of degrees over ambient, a location of the thermal event, an elapsed time since the on-set of the thermal event, an estimated time until the fuel tank will fail, an estimated time until venting, an estimated time until a countermeasure is performed, or an action to be taken to mitigate the thermal event, the thermal event signal being communicated to at least one of: a gauge of a driver compartment of the vehicle, a bystander, a responder, and/or remote fleet management personnel.

17. The vehicle of claim 13, further comprising a telematics device configured to:
communicate to a responder or remote fleet management, and
receive a signal from the responder or remote fleet management, the signal causing implementation of the emergency countermeasure in response to the detection of the thermal event.

18. The vehicle of claim 13, wherein the control circuit comprises a processor configured to activate a venting valve to cause the fuel tank to release a volume of fuel disposed therein to below a level at which the fuel tank is subject to explosive release.

19. The vehicle of claim 13, wherein the control circuit is further configured to open a valve to vent the fuel tank in response to the detection of a temperature exceeding a threshold temperature during the thermal event, and
wherein the vehicle further comprises a secondary pressure release device configured to vent the fuel tank to the atmosphere when a component thereof reaches a threshold temperature.

20. The method of claim 8, wherein the emergency countermeasure comprises at least one of: decreasing the pressure in the fuel tank, venting the fuel tank, or activating a fire suppression system.

* * * * *